(12) United States Patent
Kanao et al.

(10) Patent No.: US 11,741,187 B2
(45) Date of Patent: Aug. 29, 2023

(54) CALCULATION DEVICE, CALCULATION METHOD, AND COMPUTER PROGRAM PRODUCT

(71) Applicant: KABUSHIKI KAISHA TOSHIBA, Tokyo (JP)

(72) Inventors: Taro Kanao, Kawasaki Kanagawa (JP); Hayato Goto, Kawasaki Kanagawa (JP); Ryo Hidaka, Akishima Tokyo (JP); Kosuke Tatsumura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 17/461,452

(22) Filed: Aug. 30, 2021

(65) Prior Publication Data

US 2022/0283780 A1    Sep. 8, 2022

(30) Foreign Application Priority Data

Mar. 8, 2021  (JP) ................. 2021-036688

(51) Int. Cl.
 *G06F 17/11* (2006.01)
(52) U.S. Cl.
 CPC ................... *G06F 17/11* (2013.01)
(58) Field of Classification Search
 CPC .......... G06F 17/10; G06F 17/11; G06F 17/13; G06F 17/18
 See application file for complete search history.

(56) References Cited

U.S. PATENT DOCUMENTS 10,860,679 B2    12/2020  Goto et al.
2017/0104493 A1   4/2017  Goto
(Continued)

FOREIGN PATENT DOCUMENTS

JP    2017-73106 A    4/2017
JP    2019-145010 A   8/2019
(Continued)

OTHER PUBLICATIONS

Zou, Yu, and Mingjie Lin. "Massively Simulating Adiabatic Bifurcations with FPGA to Solve Combinatorial Optimization: Proceedings of the 2020 ACM/SIGDA International Symposium on Field-Programmable Gate Arrays." ACM Conferences, Feb. 1, 2020, https://dl.acm.org/doi/10.1145/3373087.3375298. (Year: 2020).*

(Continued)

*Primary Examiner* — Matthew D Sandifer
*Assistant Examiner* — Huy Duong
(74) *Attorney, Agent, or Firm* — Finnegan, Henderson, Farabow, Garrett & Dunner, LLP

(57) ABSTRACT

A calculation device includes a memory and one or more processors coupled to the memory and configured to alternately update, for elements each associated with first and second variables, the first and second variables, sequentially for unit times from an initial time to an end time. In an updating process for each unit time, the one or more processors are configured to: update, for each of the elements, the first variable based on the second variable; when the first variable is smaller than a first value, change the first variable to the first value and change the second variable to a third value; when the first variable is greater than a second value, change the first variable to the second value and change the second variable to the third value; and add an acceleration value calculated by a predetermined computation to the second variable.

9 Claims, 11 Drawing Sheets

(56) References Cited

U.S. PATENT DOCUMENTS

| | | | |
|---|---|---|---|
| 2019/0266212 A1* | 8/2019 | Goto | ............... G06F 9/3001 |
| 2020/0090066 A1 | 3/2020 | Kanao et al. | |
| 2021/0056160 A1 | 2/2021 | Goto et al. | |

FOREIGN PATENT DOCUMENTS

| | | |
|---|---|---|
| JP | 2020-46784 A | 3/2020 |
| JP | 2021-43667 A | 3/2021 |
| WO | WO 2021/049063 A1 | 3/2021 |

OTHER PUBLICATIONS

A. Lucas, "Ising formulations of many NP problems," Frontiers in Physics, vol. 2, Art. 5, 15 pages (2014).

M.W. Johnson et al., "Quantum annealing with manufactured spins," Nature, vol. 473, pp. 194-198 (2011).

T. Inagaki et al., "A coherent Ising machine for 2000-node optimization problems," Science, vol. 354, No. 6312, pp. 603-606 (2016).

H. Goto, "Bifurcation-based adiabatic quantum computation with a nonlinear oscillator network," Scientific Reports, 6:21686, DOI:10.1038/srep21686, 8 pages (2016).

M. Yamaoka et al., "A 20k-Spin Ising Chip to Solve Combinatorial Optimization Problems With CMOS Annealing," IEEE J. Solid-State Circuits, vol. 51, No. 1, pp. 303-309 (2016).

H. Goto et al., "Combinatorial optimization by simulating adiabatic bifurcations in nonlinear Hamiltonian systems," Science Advances, 2019;5:eaav2372,8 pages (2019).

E.S. Tiunov et al., "Annealing by simulating the coherent Ising machine" Optics EXPRESS, vol. 27, No. 7, pp. 10288-10295 (2019).

H. Goto et al., "High-performance combinatorial optimization based on classical mechanics," Science Advances, 2021;7:eabe7953, 9 pages (Feb. 3, 2021).

S. Tsukamoto et al., "An Accelerator Architecture for Combinatorial Optimization Problems," Fujitsu Sci. Tech. J., vol. 53, No. 5, pp. 8-13 (2017).

* cited by examiner

FIG.1
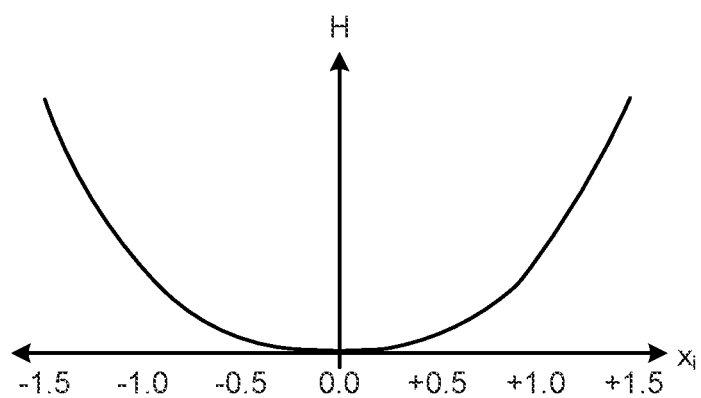
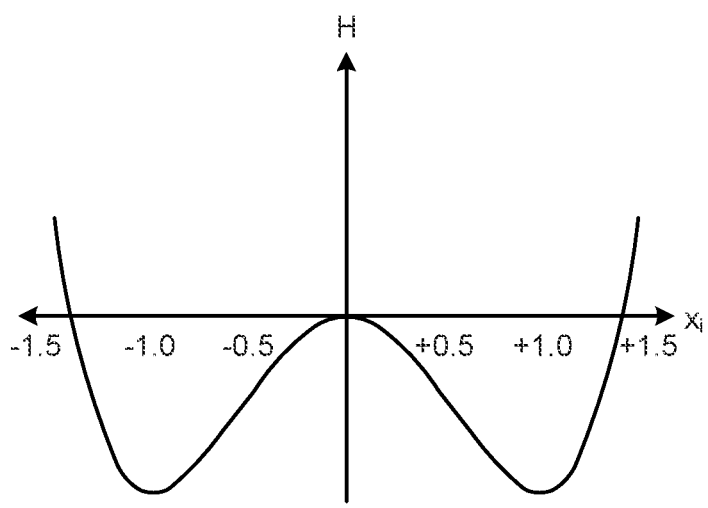

CALCULATION DEVICE, CALCULATION METHOD, AND COMPUTER PROGRAM PRODUCT

CROSS-REFERENCE TO RELATED APPLICATIONS

This application is based upon and claims the benefit of priority from Japanese Patent Application No. 2021-036688, filed on Mar. 8, 2021; the entire contents of which are incorporated herein by reference.

FIELD

Embodiments described herein relate generally to a calculation device, a calculation method, and a computer program product.

BACKGROUND

Combinatorial optimization problems are problems of selecting a combination most suitable for a purpose from among a plurality of combinations. Combinatorial optimization problems mathematically result in problems of maximizing a function, called an "objective function", having a plurality of discrete variables, or problems of minimizing the function. While combinatorial optimization problems are universal problems in various fields such as finance, logistics, transportation, designing, manufacturing, and life science, optimal solutions are not always successfully calculated because of "combinatorial explosion" in which the number of combinations increases exponentially with the problem size. Moreover, it is often difficult to obtain even an approximate solution close to the optimal solution.

There has been a demand for developing technologies for accurately calculating a solution to a combinatorial optimization problem in order to solve problems in various fields and promote social innovation and the progress in science technologies.

An object of an embodiment is to provide a calculation device, a calculation method, and a computer program product to accurately calculate a solution to a combinatorial optimization problem.

BRIEF DESCRIPTION OF THE DRAWINGS

FIG. 1 is a diagram illustrating a bifurcation phenomenon of a simulated bifurcation algorithm;

DETAILED DESCRIPTION

Figure 2:
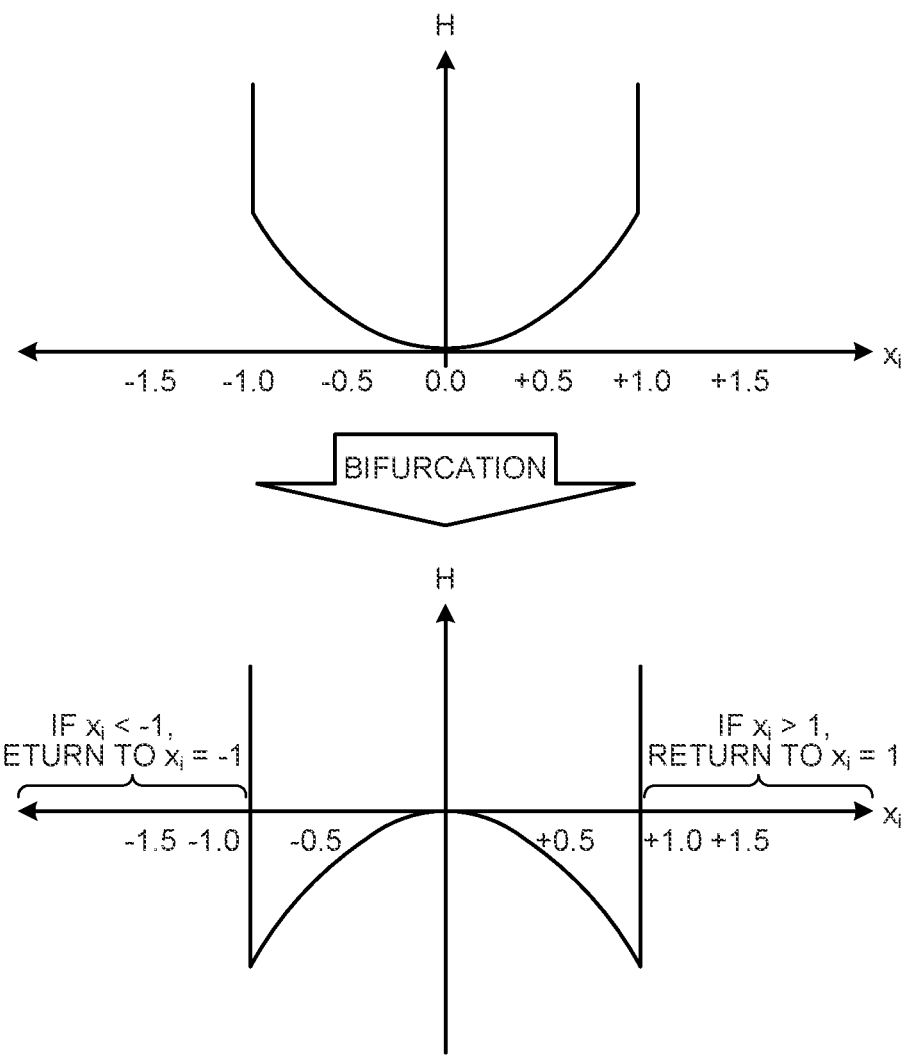
FIG. 2 is a diagram illustrating a bifurcation phenomenon of an improved algorithm.

According to an embodiment, a calculation device configured to solve a combinatorial optimization problem includes a memory and one or more processors coupled to the memory. The one or more processors are configured to: alternately update, for a plurality of elements each associated with a first variable and a second variable, the first variable and the second variable, sequentially for unit times from an initial time to an end time; and output a solution to the combinatorial optimization problem based on the first variables of the plurality of elements at the end time. The plurality of elements correspond to a plurality of discrete variables of the combinatorial optimization problem. The first variables and the second variables are each represented by a real number. The one or more processors are configured to: in an updating process for each of the unit times, for each of the plurality of elements, update the first variable based on the second variable; when the first variable is smaller than a predetermined first value, change the first variable to the first value and change the second variable to a predetermined third value; when the first variable is greater than a predetermined second value greater than the first value, change the first variable to the second value and change the second variable to the third value; and add an acceleration value calculated by a predetermined computation to the second variable.

Embodiments will be described below.

Combinatorial Optimization Problem

An Ising machine is an example of devices used for solving the Ising problem. The Ising machine calculates energy of the ground state of the Ising model. So far, the Ising model has been often used mainly as a model of ferromagnetic or phase transition phenomena. However, in recent years, the Ising model is increasingly used as a model for solving a combinatorial optimization problem. Equation (1) below shows energy of the Ising model.

$$E_{Ising} = -\sum_{i=1}^{N} h_i s_i - \frac{1}{2}\sum_{i=1}^{N}\sum_{j=1}^{N} J_{i,j} s_i s_j \qquad (1)$$

Here, $s_i$ and $s_j$ are spins. The spin is a binary variable that takes a value of either +1 or −1. $s_i$ is the $i^{th}$ spin. $s_j$ is the $j^{th}$ spin. i and j are any integer of 1 through N, both inclusive. N denotes the number of spins and is an integer equal to or greater than 2. $h_i$ denotes a local magnetic field acting on the $i^{th}$ spin. J is a matrix of a coupling coefficient representing a force acting between two spins. J is a real symmetric matrix in which diagonal components are zero. $J_{ij}$ denotes an element at the $i^{th}$ row and $j^{th}$ column of J. In other words, $J_{ij}$ is the coupling coefficient representing a force acting between the $i^{th}$ spin and the $j^{th}$ spin. The Ising model in Equation (1) is a quadratic equation of spins. The Ising model may be an extended model including a term of 3 or more orders for spins (the Ising model having multibody interaction).

The Ising machine sets the energy $E_{Ising}$ written by Equation (1) as an objective function and calculates a solution that can minimize the energy $E_{Ising}$. The solution of the Ising model ($s_1, s_2, \ldots, s_N$) in which the energy $E_{Ising}$ has the minimum value is called optimal solution. However, the solution of the Ising model is not necessarily an optimal solution but may be an approximate solution in which the energy $E_{Ising}$ is close to the minimum value. In other words, the Ising problem may be a problem to calculate not only an optimal solution but also an approximate solution.

A combinatorial optimization problem with an objective function which is a quadratic function with a discrete variable (bit) taking either 0 or 1 is called a quadratic unconstrained binary optimization (QUBO) problem. The discrete variable (bit) is converted into $s_i$ by using a computation of $(1+s_i)/2$. That is, it can be said that the QUBO problem is equivalent to the Ising problem given by Equation (1). Therefore, the 0-1 combinatorial optimization problem can be converted into the Ising problem to be solved by the Ising machine.

The Ising machine is implemented by hardware, for example, by a quantum annealer, a coherent Ising machine, and a quantum bifurcation machine. The quantum annealer implements quantum annealing using superconducting circuitry. The coherent Ising machine uses the oscillation phenomenon of a network formed with an optical parametric oscillator. The quantum bifurcation machine uses a quantum-mechanical bifurcation phenomenon in a network of a parametric oscillator having Kerr effect. While the Ising machine implemented by such hardware may achieve significant reduction of computation time, scale increase and stable operation are difficult.

A solution to the Ising problem may be calculated using widespread digital computers. Digital computers can be increased in scale and stably operated, compared with quantum annealers, coherent Ising machines, and quantum bifurcation machines. Simulated annealing (SA) is an example of algorithms for solving the Ising problem using a digital computer. However, since simulated annealing is a sequentially updating algorithm in which individual variables are sequentially updated, it is difficult to accelerate a calculation process through parallelization.

Hayato Goto, Kosuke Tatsumura, Alexander R. Dixon, "Combinatorial optimization by simulating adiabatic bifurcations in nonlinear Hamiltonian systems", Science Advances, Vol. 5, no. 4, eaav2372, 19 Apr. 2019 develops a simulated bifurcation algorithm as an algorithm for solving a combinatorial optimization problem. The simulated bifurcation algorithm can solve a large-scale combinatorial optimization problem with a digital computer using the Ising model. The simulated bifurcation algorithm also can solve a large-scale combinatorial optimization problem with electronic circuitry such as a central processing unit (CPU), a microprocessor, a graphics processing unit (GPU), a field-programmable gate array (FPGA), an application specific integrated circuit (ASIC), or a combination circuit thereof.

Simulated Bifurcation Algorithm The simulated bifurcation algorithm uses two variables $x_i$ and $y_i$ each corresponding to N elements. The variable $x_i$ may be called first variable, and the variable $y_i$ may be called second variable. In the simulated bifurcation algorithm, each of N elements represents a virtual particle. N elements correspond to N spins in the Ising problem. Therefore, N elements correspond to N discrete variables (bits) of a combinatorial optimization problem. Both the variable $x_i$ and the variable $y_i$ are continuous variables represented by real numbers. The variable $x_i$ denotes the position of the $i^{th}$ particle of N particles. The variable $y_i$ denotes the momentum of the $i^{th}$ particle. N denotes the number of spins included in the Ising model and is an integer equal to or greater than 2, and i denotes any integer of 1 through N, both inclusive, and denotes an index that identifies each of N elements.

The simulated bifurcation algorithm numerically solves simultaneous ordinary differential equations in Equation (2) below for N variables $x_i$ and N variables $y_i$.

$$\frac{dx_i}{dt} = \frac{\partial H}{\partial y_i} = Dy_i \qquad (2)$$

$$\frac{dy_i}{dt} = -\frac{\partial H}{\partial x_i} = \{-D + p(t) - Kx_i^2\}x_i + f_i$$

H is the Hamiltonian in Equation (3) below.

$$H = \sum_{i=1}^{N} \left[ \frac{D}{2}(x_i^2 + y_i^2) - \frac{p(t)}{2}x_i^2 + \frac{K}{4}x_i^4 - c\left(h_i x_i \alpha(t) + \frac{1}{2}\sum_{j=1}^{N} J_{i,j} x_i x_j\right) \right] \qquad (3)$$

The coefficient D is a predetermined constant and corresponds to detuning. The coefficient p(t) corresponds to pumping amplitude and its value monotonously increases according to the number of times of updating in calculation of the simulated bifurcation algorithm. The variable t represents time. The initial value of the coefficient p(t) may be set to 0. The coefficient K corresponds to positive Kerr coefficient.

$f_i$ is external force and given by Equation (4) below.

$$f_i = -cz_i \qquad (4)$$

$$z_i = -h_i \alpha(t) - \sum_{j=1}^{N} J_{i,j} x_j$$

In Equation (4), $z_i$ is given by a partial derivative of the expression inside the parentheses in Equation (3) with respect to the variable $x_i$. The expression inside the parentheses in Equation (3) corresponds to the energy $E_{Ising}$ of the Ising model.

The coefficient c may be, for example, a constant determined in advance before calculation is performed. For example, c may be set to a value close to the reciprocal of the maximum eigenvalue of the matrix J. For example, c may be $0.5D\sqrt{(N/2n)}$. Here, n is the number of edges of a graph for a combinatorial optimization problem. Furthermore, $\alpha(t)$ is a coefficient increasing with p(t). For example, $\alpha(t)$ may be $\sqrt{(p(t))}$.

The simulated bifurcation algorithm can solve a combinatorial optimization problem to minimize an objective function including a discrete variable of 3 or more orders. The combinatorial optimization problem to minimize an objective function including a discrete variable of 3 or more orders is called a higher order binary optimization (HOBO) problem. To solve a HOBO problem, the simulated bifurcation algorithm uses the Ising model extended to higher order.

The energy in the Ising model extended to higher order is given by Equation (5) below.

$$E_{HOBO} = \sum_{i=1}^{N} J_i^{(1)} s_i + \frac{1}{2}\sum_{i=1}^{N}\sum_{j=1}^{N} J_{i,j}^{(2)} s_i s_j + \frac{1}{3!}\sum_{i=1}^{N}\sum_{j=1}^{N}\sum_{k=1}^{N} J_{i,j,k}^{(3)} s_i s_j s_k + \ldots \quad (5)$$

Here, $J^{(n)}$ is an $n^{th}$-rank tensor. $J^{(n)}$ is generalization of the local magnetic field $h_i$ and the matrix $J$ of the coupling coefficient in Equation (1). For example, $J^{(1)}$ corresponds to $h_i$. In $J^{(n)}$, when a plurality of subscripts have the same value, the value of an element is 0. Although Equation (5) denotes the terms up to order 3, order 4 and higher can be defined similarly. Equation (5) corresponds to the energy of the Ising model including a multibody interaction.

When the simulated bifurcation algorithm solves a HOBO problem, the Hamiltonian H in Equation (3) can be replaced by Equation (6).

$$H = \sum_{i=J}^{N} \left[ \frac{D}{2}(x_i^2 + y_i^2) - \frac{p(t)}{2}x_i^2 + \frac{K}{4}x_i^4 + \right.$$
$$\left. c\left( J_i^{(1)} x_i \alpha(t) + \frac{1}{2}\sum_{j=1}^{N} J_{i,j}^{(2)} x_i x_j + \frac{1}{3!}\sum_{j=1}^{N}\sum_{k=1}^{N} J_{i,j,k}^{(3)} x_i x_j x_k + \ldots \right) \right]$$

$$H_{Ising} = \sum_{i=1}^{N} \left[ J_i^{(1)} x_i \alpha(t) + \frac{1}{2}\sum_{j=1}^{N} J_{i,j}^{(2)} x_i x_j + \frac{1}{3!}\sum_{j=1}^{N}\sum_{k=1}^{N} J_{i,j,k}^{(3)} x_i x_j x_k + \ldots \right]$$

When the simulated bifurcation algorithm solves a HOBO problem, the external force $f_i$ in Equation (4) is replaced by Equation (7).

$$f_i = -cz_i \quad (7)$$
$$z_i = \frac{\partial H_{Ising}}{\partial x_i} = J_i^{(1)} \alpha(t) + \sum_{j=1}^{N} J_{i,j}^{(2)} x_j + \sum_{j=1}^{N}\sum_{k=1}^{N} J_{i,j,k}^{(3)} x_j x_k + \ldots$$

In Equation (7), $z_i$ is given by a partial derivative of the expression inside the parentheses in Equation (6) with respect to the variable $x_i$. The expression inside the parentheses in Equation (6) corresponds to the energy $E_{Ising}$ of the Ising model extended to higher order.

The simulated bifurcation algorithm then calculates the value of the spin $s_i$ based on the sign of the variable $x_i$ after the value of $p(t)$ is increased from an initial value (for example, 0) to a prescribed value. The simulated bifurcation algorithm calculates the value of the spin $s_i$ using the signum function, for example, in which when $x_i > 0$, $\text{sgn}(x_i) = 1$, and when $x_i < 0$, $\text{sgn}(x_i) = -1$.

Computation of Simulated Bifurcation Algorithm

When a QUBO problem is solved, the simulated bifurcation algorithm solves differential equations given by Equation (2), Equation (3), and Equation (4) using the symplectic Euler method. When a HOBO problem is solved, the simulated bifurcation algorithm solves differential equations given by Equation (2), Equation (6), and Equation (7) using the symplectic Euler method.

When the symplectic Euler method is used, the differential equations given by Equation (2), Equation (3), and Equation (4) and the differential equations given by Equation (2), Equation (6), and Equation (7) can be written into a discrete recurrence relation as shown by Equation (8).

$$x_i(t+\Delta t) = x_i(t) + Dy_i(t)\Delta t$$
$$y_i(t+\Delta t) = y_i(t) + [\{-D + p(t+\Delta t) - Kx_i^2(t+\Delta t)\}x_i(t+\Delta t) + f_i(t+\Delta t)]\Delta t$$
$$f_i(t+\Delta t) = -cz_i(t+\Delta t) \quad (8)$$

t is time. $\Delta t$ is a time step (unit time, time step size).

When the simulated bifurcation algorithm is executed, a digital computer or an electronic circuit such as an FPGA updates N variables $x_i$ and N variables $y_i$ sequentially for each time step from the initial time and alternately between variables $x_i$ and variables $y_i$, based on the algorithm in Equation (8). The digital computer or the electronic circuit such as an FPGA then binarizes the values of N variables $x_i$ at the end time using the signum function and outputs the values of N spins.

Equation (8) is written using time t and time step $\Delta t$ in order to show the correspondence with the differential equations. However, when the symplectic Euler method is performed by a digital computer or an electronic circuit such as an FPGA, the algorithm for computing Equation (8) may not necessarily include time t or time step $\Delta t$ as explicit parameters. For example, when time step $\Delta t$ is 1, the algorithm for computing Equation (8) need not include time step $\Delta t$. For example, when time t is not included as an explicit parameter, the algorithm for computing Equation (8) performs a process with $x_i(t+\Delta t)$ as the updated value of $x_i(t)$. More specifically, the algorithm for computing Equation (8) performs a process using "t" in Equation (8) as a parameter specifying a variable before update and "$t+\Delta t$" as a parameter specifying a variable after update. This is applicable to an improved algorithm of Equation (8) described below.

Improved Algorithm

The inventor has invented an algorithm (improved algorithm) by improving the simulated bifurcation algorithm. The improved algorithm further performs the following process when computing the differential equations given by Equation (8) using the symplectic Euler method.

More specifically, when the variable $x_i$ is smaller than a predetermined first value after updating of the variable $x_i$, the improved algorithm changes the variable $x_i$ to the first value and changes the variable $y_i$ to a predetermined third value. When the variable $x_i$ is greater than a second value greater than the first value after updating of the variable $x_i$, the improved algorithm changes the variable $x_i$ to the second value and changes the variable $y_i$ to the third value.

For example, the first value is $-1$, the second value is $+1$, and the third value is 0. In this case, when the variable $x_i$ is smaller than $-1$ after updating of the variable $x_i$, the improved algorithm changes the variable $x_i$ to $-1$ and changes the variable $y_i$ to 0. When the variable $x_i$ is greater than $+1$ after updating of the variable $x_i$, the improved algorithm changes the variable $x_i$ to $+1$ and changes the variable $y_i$ to 0.

Furthermore, after updating the variable $x_i$ and the variable $y_i$, the improved algorithm adds an acceleration value calculated by a predetermined computation to the variable $y_i$. The acceleration value is a value, for example, obtained by multiplying the variable $y_i$ (that is, the variable $y_i$ before update) at the previous time by the product ($r\Delta t$) of a prescribed coefficient (r) and a unit time ($\Delta t$). The prescribed coefficient (r) is, for example, a predetermined constant. The prescribed coefficient may be a value determined for each updating based on a random number. When the first value is −1, the second value is +1, and the third value is 0, the prescribed coefficient is, for example, a value greater than 0 and smaller than 1.

"$Kx_i^2(t+\Delta t)$" in Equation (8) is a term having the function of preventing divergence of the variable $x_i$ during calculation. Since the improved algorithm limits, for each updating, the variable $x_i$ in a range from the first value (for example, −1) to the second value (for example, +1), both inclusive, the variable $x_i$ does not diverge during calculation. The improved algorithm therefore can compute a differential equation in which the term "$Kx_i^2(t+\Delta t)$" in the differential equation given by Equation (8) is deleted.

Then, the improved algorithm is computed using Equation (9) instead of the algorithm in Equation (8).

$$x_i(t+\Delta t) = x_i(t) + Dy_i(t)\Delta t$$

$$y_i(t+\Delta t) = y_i(t) + [\{-D+p(t+\Delta t)\}x_i(t+\Delta t) + f_i(t+\Delta t)]\Delta t$$

$$f_i(t+\Delta t) = -cz_i(t+\Delta t)$$

In the case of a QUBO problem, $z_i(t+\Delta t)$ in Equation (9) is given by Equation (10) below.

$$z_i(t+\Delta t) = -h_i \alpha(t+\Delta t) - \sum_{j=1}^{N} J_{i,j} x_j(t+\Delta t) \quad (10)$$

In the case of a HOBO problem, $z_i(t+\Delta t)$ in Equation (9) is given by Equation (11) below.

$$z_i(t+\Delta t) = J_i^{(1)} \alpha(t+\Delta t) + \sum_{j=1}^{N} J_{i,j}^{(2)} s_j(t+\Delta t) + \sum_{j=1}^{N}\sum_{k=1}^{N} J_{i,j,k}^{(3)} s_j(t+\Delta t) s_k(t+\Delta t) + \ldots \quad (11)$$

The improved algorithm in Equation (9) above is to solve the Hamiltonian equation in the same manner as Equation (8), and the variable $y_i$ corresponds to the momentum. Therefore, the solution can be calculated stably using the symplectic Euler method, even without using a small value as the time step $\Delta t$.

The combinatorial optimization problem that can be solved by the improved algorithm is not limited to the Ising problem, and a common combinatorial optimization problem with binary variables can be solved. For example, the improved algorithm can be applied to a combinatorial optimization problem in which a variable of the objective function is a binary variable that takes one of a (first value) and b (second value) greater than a. When a solution of the objective function is calculated after a certain number of times of updating, a function $f(x_i)$ whose range is binary, a or b, may be used instead of the signum function. The value of this function $f(x_i)$ is determined based on the result of comparison of the value of the variable $x_i$ with a threshold value v (a<v<b). For example, if $x_i$<v, $f(x_i)$=a. If v<$x_i$, $f(x_i)$=b. For example, when $x_i$=v, $f(x_i)$=a or $f(x_i)$=b. The threshold value v may be, for example, (a+b)/2.

FIG. 1 is a diagram illustrating a bifurcation phenomenon of the variables $x_i$ obtained when an optimization problem was solved by the simulated bifurcation algorithm. When an optimization problem is solved by the simulated bifurcation algorithm, a bifurcation phenomenon occurs, that is, a system with a single stable motion state changes to a system with two stable motion states as the parameters in the system change. As illustrated in FIG. 1, as the bifurcation phenomenon proceeds, the variables $x_i$ are concentrated on the vicinity of −1 or +1 but also spread to a region smaller than −1 or a region greater than 1.

FIG. 2 is a diagram illustrating a bifurcation phenomenon of the variables $x_i$ obtained when an optimization problem was solved by the improved algorithm. When an optimization problem is solved by the improved algorithm, a bifurcation phenomenon occurs, that is, a system with a single stable motion state changes to a system with two stable motion states as the parameters in the system change, in the same manner as the simulated bifurcation algorithm. However, the improved algorithm returns $x_i$ smaller than −1 to −1 and returns $x_i$ greater than +1 to +1, so that the variables $x_i$ do not spread to a region smaller than −1 or a region greater than +1.

Figure 3:
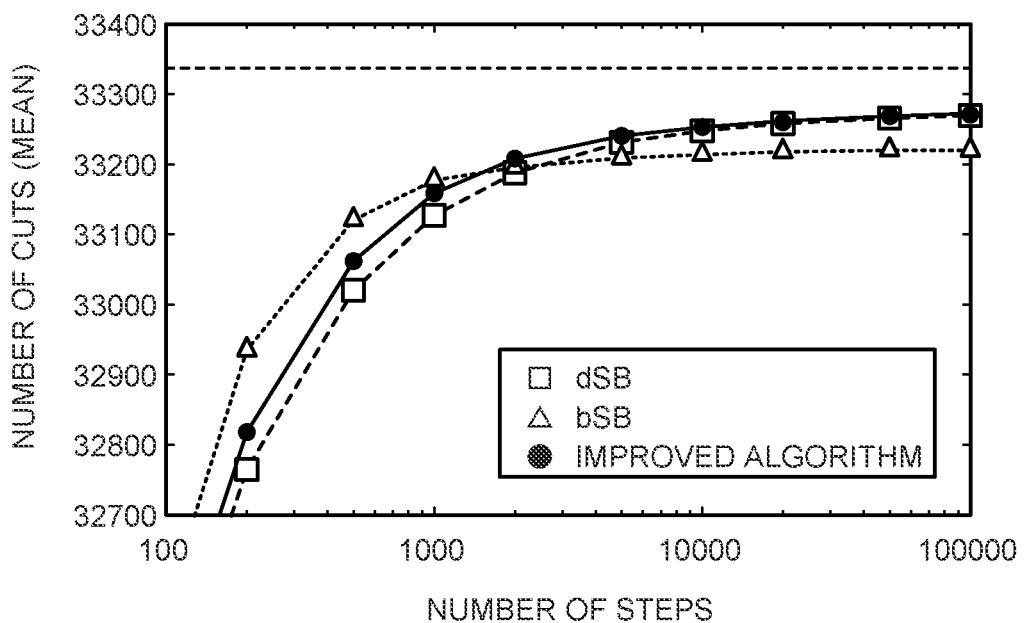
FIG. 3 is a diagram illustrating a mean value of the numbers of cuts obtained when a maximum cut problem was solved.
Figure 4:
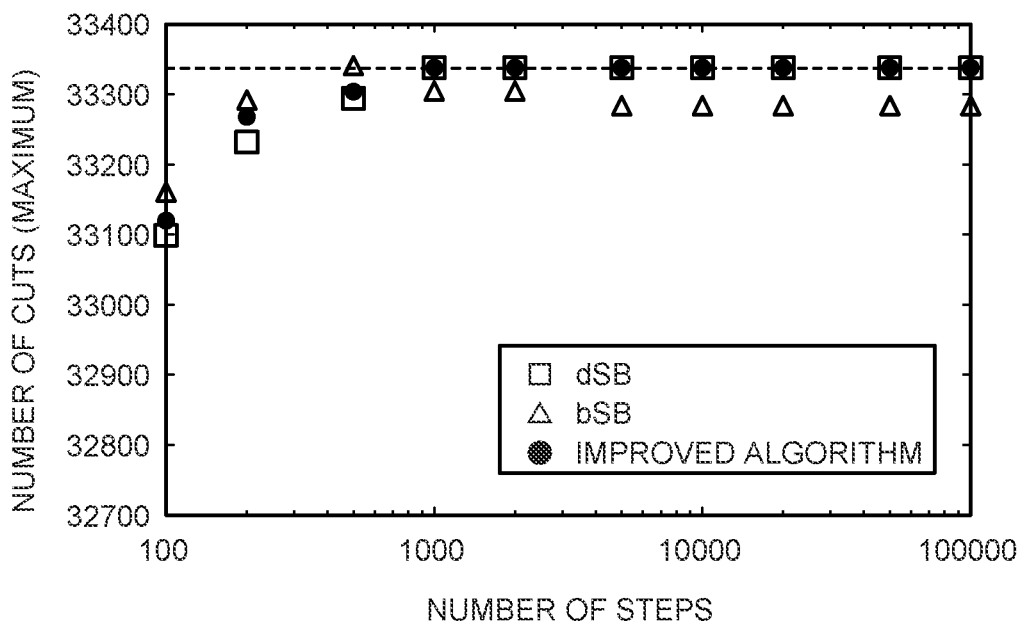
FIG. 4 is a diagram illustrating a maximum value of the numbers of cuts obtained when the maximum cut problem was solved.
Figure 5:
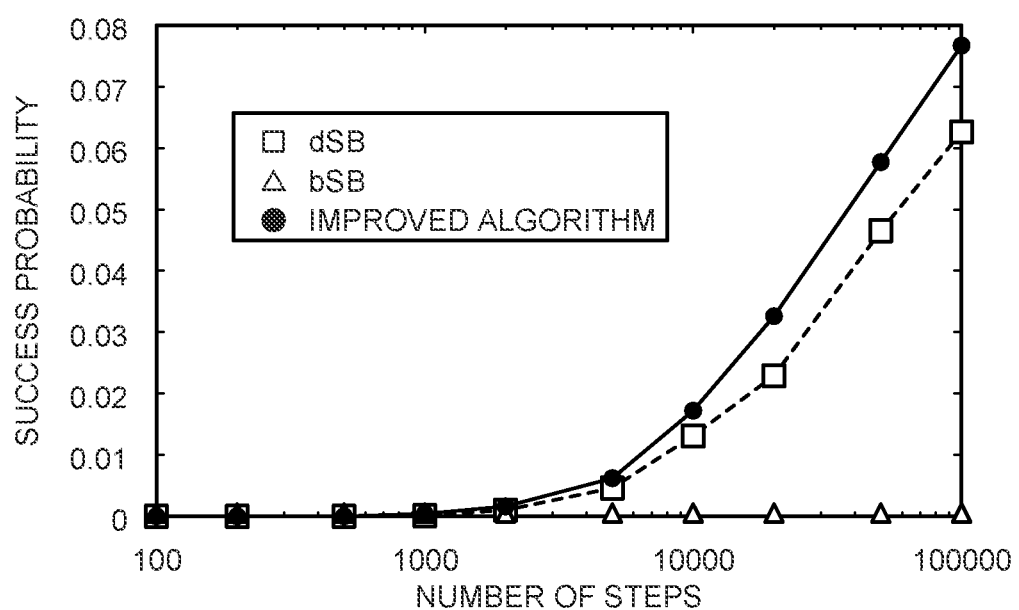
FIG. 5 is a diagram illustrating a success probability obtained when the maximum cut problem was solved.

FIG. 3 and FIG. 4 are diagrams illustrating the result of the number of cuts with respect to the time step number when the maximum cut problem K2000 was solved 10000 times. FIG. 3 illustrates the mean value of the numbers of cuts. FIG. 4 illustrates the maximum value of the numbers of cuts. FIG. 5 illustrates the success probability that is the probability that the maximum cut value was obtained when the maximum cut problem K2000 was solved 10000 times using the improved algorithm.

FIG. 3, FIG. 4, and FIG. 5 illustrate the results of performing the improved algorithm where D is 1, K is 1, c is 0.9√(1999), r is 0.5, $\Delta t$ is 1.1, and p is linearly increased from 0 to 1. The broken line Cmax in FIG. 3 and FIG. 4 indicates the maximum cut value of 33337 known in K2000. Referring to FIG. 3 and FIG. 4, it is understood that the improved algorithm comes close to the maximum cut value and can solve the optimization problem accurately. H. Goto, K. Endo, M. Suzuki, Y. Sakai, T. Kanao, Y. Hamakawa, R. Hidaka, M. Yamasaki, K. Tatsumura, "High-performance combinatorial optimization based on classical mechanics", Science Advances; 7, eabe7953", February 2021 describes other methods (bSB, dSB) which are improved simulated bifurcation algorithms. FIG. 3, FIG. 4, and FIG. 5 also show the results of solving the maximum cut problem K2000 by bSB and dSB as comparative examples. The comparison with bSB and dSB has suggested that the improved algorithm provides equivalent or surpassing results. As illustrated in FIG. 5, it has also been found that the improved algorithm yields a higher success probability than bSB and dSB.

Functional Configuration

Figure 6:
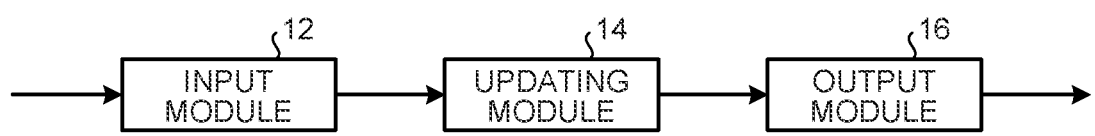
FIG. 6 is a functional configuration diagram of a calculation device according to the present embodiment.

FIG. 6 is a diagram illustrating a functional configuration of a calculation device 10 according to the present embodiment.

The calculation device 10 solves an optimization problem using the improved algorithm. The calculation device 10 is implemented, for example, by an information processing device such as a computer, a computer system including a plurality of computers or servers mutually communicating through a network, or a PC cluster in which a plurality of computers work together to execute information processing. The calculation device 10 is implemented by electronic circuitry such as a CPU, a microprocessor, a GPU, an FPGA or an ASIC, or a combination thereof.

The calculation device 10 includes, as a functional configuration, an input module 12, an updating module 14, and an output module 16.

The input module 12 receives information (for example, N, J, h) for defining an objective function of a combinatorial optimization problem and information (x, $\Delta t$, T, p(t), $\alpha(t)$)

representing coefficients necessary for executing the improved algorithm from an external device and applies the received information to the updating module 14. The updating module 14 uses the improved algorithm and, for each of a plurality of elements each associated with the first variable ($x_i$) and the second variable ($y_i$), alternately updates the first variable ($x_i$) and the second variable ($y_i$) sequentially for each unit time ($\Delta t$) from an initial time (t=0) to an end time (t=T).

The output module 16 then outputs a solution to the combinatorial optimization problem based on the first variables ($x_i$) of the elements at the end time (t=T). For example, the output module 16 calculates, for each of the elements at the end time, a value of a discrete variable by binarizing the first variable ($x_i$) with a preset threshold value. The output module 16 then outputs the calculated values of discrete variables as a solution to the combinatorial optimization problem.

Process Flow

Figure 7:
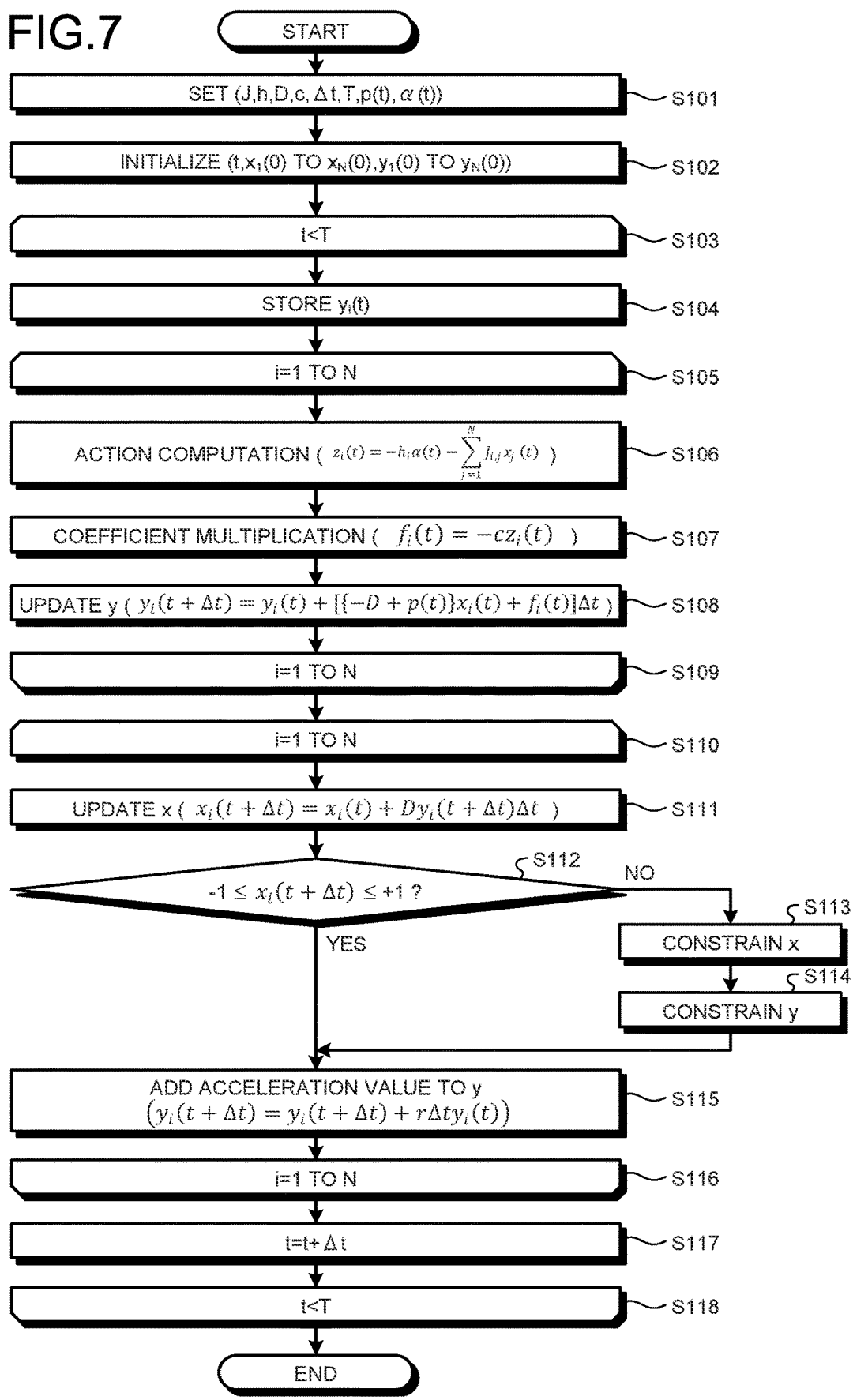
FIG. 7 is a flowchart illustrating a first example of a process of an updating module.

FIG. 7 is a diagram illustrating a first example of a process of the updating module 14. The updating module 14 performs a process, for example, according to the flow illustrated in FIG. 7.

First of all, at S101, the updating module 14 sets parameters. Specifically, the updating module 14 sets J, which is a matrix including N×N coupling coefficients, and h, which is an array including local magnetic field coefficients representing N local magnetic fields. When a HOBO problem is to be solved, the updating module 14 sets $J^{(n)}$, which is an $m^{th}$ rank tensor including Nm action coefficients, instead of J and h. In this case, (m) denotes the order of a variable of the objective function in the HOBO problem. The updating module 14 further sets the coefficient D, the coefficient c, $\Delta t$ denoting the unit time, T denoting the end time, the function p(t), and the function α(t), where p(t) and α(t) are the increasing function that is 0 at t=initial time (for example, 0) and 1 at t=end time (T). The updating module 14 sets J and h in accordance with information received from the input module 12. The updating module 14 may set D, c, $\Delta t$, T, p(t), and α(t) in accordance with parameters received from the input module 12 or may set parameters determined in advance and unable to be changed.

Subsequently, at S102, the updating module 14 initializes the variables. Specifically, the updating module 14 initializes t that is a variable denoting time to the initial time (for example, 0). Furthermore, the updating module 14 substitutes an initial value received from the user, a predetermined fixed value, or a random number into each of N first variables ($x_1(t)$ to $x_N(t)$) and N second variables ($y_1(t)$ to $y_N(t)$).

Subsequently, the updating module 14 repeats the loop process between S103 and S118 until t becomes greater than T. In one loop process, the updating module 14 calculates N first variables ($x_1(t+\Delta t)$ to $x_N(t+\Delta t)$) at the target time (t+$\Delta t$), based on N second variables ($y_i(t+\Delta t)$ to $y_N(t+\Delta t)$) at the target time (t+$\Delta t$). In one loop process, the updating module 14 calculates N second variables ($y_i(t+\Delta t)$ to $y_N(t+\Delta t)$) at the target time (t+$\Delta t$), based on N first variables ($x_1(t)$ to $x_N(t)$) at the previous time (t) and N second variables ($y_1(t)$ to $y_N(t)$) at the previous time (t).

The previous time (t) is the time a unit time ($\Delta t$) before the target time (t+$\Delta t$). That is, the updating module 14 repeats the loop process between S103 and S118 to update N first variables ($x_1(t)$ to $x_N(t)$) and N second variables ($y_i(t)$ to $y_N(t)$) sequentially for each unit time ($\Delta t$) from the initial time (t=0) to the end time (t=T).

At S104, the updating module 14 stores N second variables ($y_1(t)$ to $y_N(t)$) at the previous time (t). The updating module 14 uses the stored N second variables ($y_i(t)$ to $y_N(t)$) to calculate an acceleration value at S115 described later.

Subsequently, the updating module 14 repeats the loop process between S105 and S109 while incrementing i by one from i=1 to i=N, where i is an integer of 1 to N and an index representing the process target of N elements. Each of N elements is associated with the first variable ($x_i(t)$) and the second variable ($y_i(t)$). In the loop process between S105 and S109, the updating module 14 performs the process for the $i^{th}$ element of N elements as a target element.

At S106, the updating module 14 calculates an update value ($z_i(t)$), based on the first variable ($x_1(t)$ to $x_N(t)$) at the previous time (t) for each of N elements and a predetermined action coefficient for each of sets of the target element and each of N elements. In the case of a QUBO problem, the action coefficient is the coupling coefficient included in J and the local magnetic field coefficient included in h. In the case of a HOBO problem, the action coefficient is included in $J^{(n)}$.

In the case of a QUBO problem, the updating module 14 calculates Equation (12).

$$z_i(t) = -h_i\alpha(t) - \sum_{j=1}^{N} J_{i,j} x_j(t) \quad (12)$$

In the case of a HOBO problem, the updating module 14 calculates Equation (13).

$$z_i(t) = J_i^{(1)}\alpha(t) + \sum_{j=1}^{N} J_{i,j}^{(2)} x_j(t) + \sum_{j=1}^{N}\sum_{k=1}^{N} J_{i,j,k}^{(3)} x_j(t)x_k(t) + \ldots \quad (13)$$

Subsequently, at S107, the updating module 14 calculates external force ($f_i(t)$) by multiplying the update value ($z_i(t)$) by the coefficient (c). Specifically, the updating module 14 calculates Equation (14).

$$f_i(t) = -cz_i(t) \quad (14)$$

Subsequently, at S108, the updating module 14 calculates the second variable ($y_i(t+\Delta t)$) of the target element at the target time (t+$\Delta t$) by adding a value obtained by multiplying a value based on the external force ($f_i(t)$) and the first variable ($x_i(t)$) of the target element at the previous time (t) by the unit time ($\Delta t$), to the second variable ($y_i(t)$) of the target element at the previous time (t). Specifically, the updating module 14 calculates Equation (15).

$$y_i(t+\Delta t) = y_i(t) + [\{-D+p(t)\}x(t)+f_i(t)]\Delta t \quad (15)$$

For each of N elements, the updating module 14 updates the second variable ($y_i(t+\Delta t)$) at the target time (t+$\Delta t$), based on the first variable ($x_1(t)$ to $x_N(t)$) at the previous time (t), by performing the loop process between S105 and S109 as described above N times. If the loop process between S105 and S109 is performed N times, the updating module 14 proceeds to S110.

Subsequently, the updating module 14 repeats the loop process between S110 and S116 while incrementing i by one from i=1 to i=N. In the loop process between S110 and S116, the updating module 14 performs the process for the $i^{th}$ element of N elements as a target element.

At S111, the updating module 14 calculates the first variable ($x_i(t+\Delta t)$) of the target element at the target time (t+$\Delta t$) by adding a value obtained by multiplying the second variable ($y_i(t+\Delta t)$) of the target element at the target time ($t+\Delta t$) by the predetermined constant (D) and the unit time ($\Delta t$), to the first variable ($x_i(t)$) of the target element at the previous time (t). Specifically, the updating module 14 calculates Equation (16).

$$x_i(t+\Delta t)=x_i(t)+Dy_i(t+\Delta t)\Delta t \quad (16)$$

Subsequently, at S112, the updating module 14 determines whether the first variable ($x_i(t+\Delta t)$) of the target element at the target time ($t+\Delta t$) is in a range from a predetermined first value to a predetermined second value, both inclusive. In the present example, the first value is −1 and the second value is +1. For example, the second value is the unit amount of the first variable ($x_i(t)$) that is a continuous quantity. For example, the second value is a value with the reversed sign of the first value.

The updating module 14 proceeds to S115 (Yes at S112) if the first variable ($x_i(t+\Delta t)$) of the target element at the target time ($t+\Delta t$) is in the range from the first value to the second value, both inclusive (Yes at S112). The updating module 14 proceeds to S113 if the first variable ($x_i(t+\Delta t)$) of the target element at the target time ($t+\Delta t$) is smaller than the first value or greater than the second value (No at S112).

At S113, the updating module 14 performs a constraining process for the first variable ($x_i(t+\Delta t)$) of the target element at the target time ($t+\Delta t$). Specifically, when the first variable ($x_i(t+\Delta t)$) of the target element at the target time ($t+\Delta t$) is smaller than the first value, the updating module 14 changes the first variable ($x_i(t+\Delta t)$) to the first value. When the first variable ($x_i(t+\Delta t)$) of the target element at the target time ($t+\Delta t$) is greater than the second value, the updating module 14 changes the first variable ($x_i(t+\Delta t)$) to the second value. In the present example, when the first variable ($x_i(t+\Delta t)$) of the target element at the target time ($t+\Delta t$) is smaller than −1, the updating module 14 changes the first variable ($x_i(t+\Delta t)$) to −1. When the first variable ($x_i(t+\Delta t)$) of the target element at the target time ($t+\Delta t$) is greater than +1, the updating module 14 changes the first variable ($x_i(t+\Delta t)$) to +1.

Subsequently to S113, at S114, the updating module 14 performs a constraining process for the second variable ($y_i(t+\Delta t)$) of the target element at the target time ($t+\Delta t$). Specifically, the updating module 14 changes the second variable ($y_i(t+\Delta t)$) of the target element at the target time ($t+\Delta t$) to a predetermined third value. The third value is, for example, a value greater than the first value and smaller than the second value. In the present example, the third value is 0. When S114 is finished, the updating module 14 proceeds to S115.

At S115, the updating module 14 adds an acceleration value calculated by a predetermined computation to the second variable ($y_i(t+\Delta t)$) of the target element at the target time ($t+\Delta t$). For example, the acceleration value is a value obtained by multiplying the second variable ($y_i(t)$) at the previous time by the product ($r\Delta t$) of a prescribed coefficient (r) and a unit time ($\Delta t$). The prescribed coefficient (r) is, for example, a predetermined constant. For example, the prescribed coefficient (r) is a value greater than 0 and smaller than 1. In this case, the updating module 14 performs a computation given by Equation (17).

$$y_i(t+\Delta t)=y_i(t+\Delta t)+\{r\Delta t \times y_i(t)\} \quad (17)$$

The prescribed coefficient (r) may be any other value that does not depend on the time (t). For example, the prescribed coefficient (r) may be a value based on random numbers in a range greater than 0 and smaller than 1. When S115 is finished, the updating module 14 proceeds to S116.

The updating module 14 performs the following process by performing the loop process between S110 and S116 as described above N times. That is, for each of N elements, the updating module 14 updates the first variable ($x_i(t+\Delta t)$) of the target element at the target time ($t+\Delta t$), based on the second variable ($y_i(t+\Delta t)$) of the target element at the target time ($t+\Delta t$). Subsequently, for each of N elements, when the first variable ($x_i(t+\Delta t)$) of the target element at the target time ($t+\Delta t$) is smaller than the first value, the updating module 14 changes the first variable ($x_i(t+\Delta t)$) of the target element at the target time ($t+\Delta t$) to the first value. Furthermore, for each of N elements, when the first variable ($x_i(t+\Delta t)$) of the target element at the target time ($t+\Delta t$) is greater than the second value, the updating module 14 changes the first variable ($x_i(t+\Delta t)$) of the target element at the target time ($t+\Delta t$) to the second value. Furthermore, for each of N elements, when the first variable ($x_i(t+\Delta t)$) of the target element at the target time ($t+\Delta t$) is smaller than the first value or greater than the second value, the updating module 14 changes the second variable ($y_i(t+\Delta t)$) of the target element at the target time ($t+\Delta t$) to the third value. Furthermore, for each of N elements, the updating module 14 adds an acceleration value obtained by multiplying the second variable ($y_i(t)$) of the target element at the previous time (t) by the product ($r\Delta t$) of the prescribed coefficient (r) and the unit time ($\Delta t$), to the second variable ($y_i(t+\Delta t)$) of the target element at the target time ($t+\Delta t$).

If the loop process between S110 and S116 is performed N times, the updating module 14 proceeds to S117.

At S117, the updating module 14 updates the target time ($t+\Delta t$) by adding the unit time ($\Delta t$) to the previous time (t). At S118, the updating module 14 repeats the process from S104 to S117 until t exceeds the end time (T). When t becomes greater than the end time (T), the updating module 14 terminates this flow.

Then, for each of N elements, the updating module 14 calculates the value of the corresponding spin, in accordance with the sign of the first variable ($x_i(T)$) at the end time (t=T). For example, when the first variable ($x_i(T)$) at the end time (t=T) has a negative sign, the updating module 14 sets the corresponding spin to −1, and when positive, sets the corresponding spin to +1. Then, the updating module 14 outputs the calculated values of a plurality of spins or values obtained by converting the calculated values of a plurality of spins into discrete variables, as a solution to the combinatorial optimization problem.

By performing the process in accordance with the flowchart illustrated in FIG. 7, for each of N elements, the updating module 14 alternately updates the first variable ($x_i(t+\Delta t)$) and the second variable ($y_i(t+\Delta t)$), sequentially for each unit time from the initial time (t=0) to the end time (t=T). By performing the process in accordance with the flowchart in FIG. 7, in the updating process for each unit time, for each of N elements, the updating module 14 calculates the first variable ($x_i(t+\Delta t)$) at the target time ($t+\Delta t$) after calculating the second variable ($y_i(t+\Delta t)$) at the target time ($t+\Delta t$). By performing the process in accordance with the flowchart in FIG. 7, in the updating process for each unit time, for each of N elements, the updating module 14 calculates the second variable ($y_i(t+\Delta t)$) at the target time ($t+\Delta t$) before updating the first variable ($x_i(t+\Delta t)$) at the target time ($t+\Delta t$) and adds an acceleration value to the second variable ($y_i(t+\Delta t)$) at the target time ($t+\Delta t$) after updating the first variable ($x_i(t+\Delta t)$) at the target time ($t+\Delta t$).

As described above, the updating module 14 can calculate N first variables ($x_1(t)$ to $x_N(t)$) and N second variables ($y_1(t)$ to $y_N(t)$) at the end time (t=T) by performing a computation in accordance with the improved algorithm using the symplectic Euler method.

Figure 8:
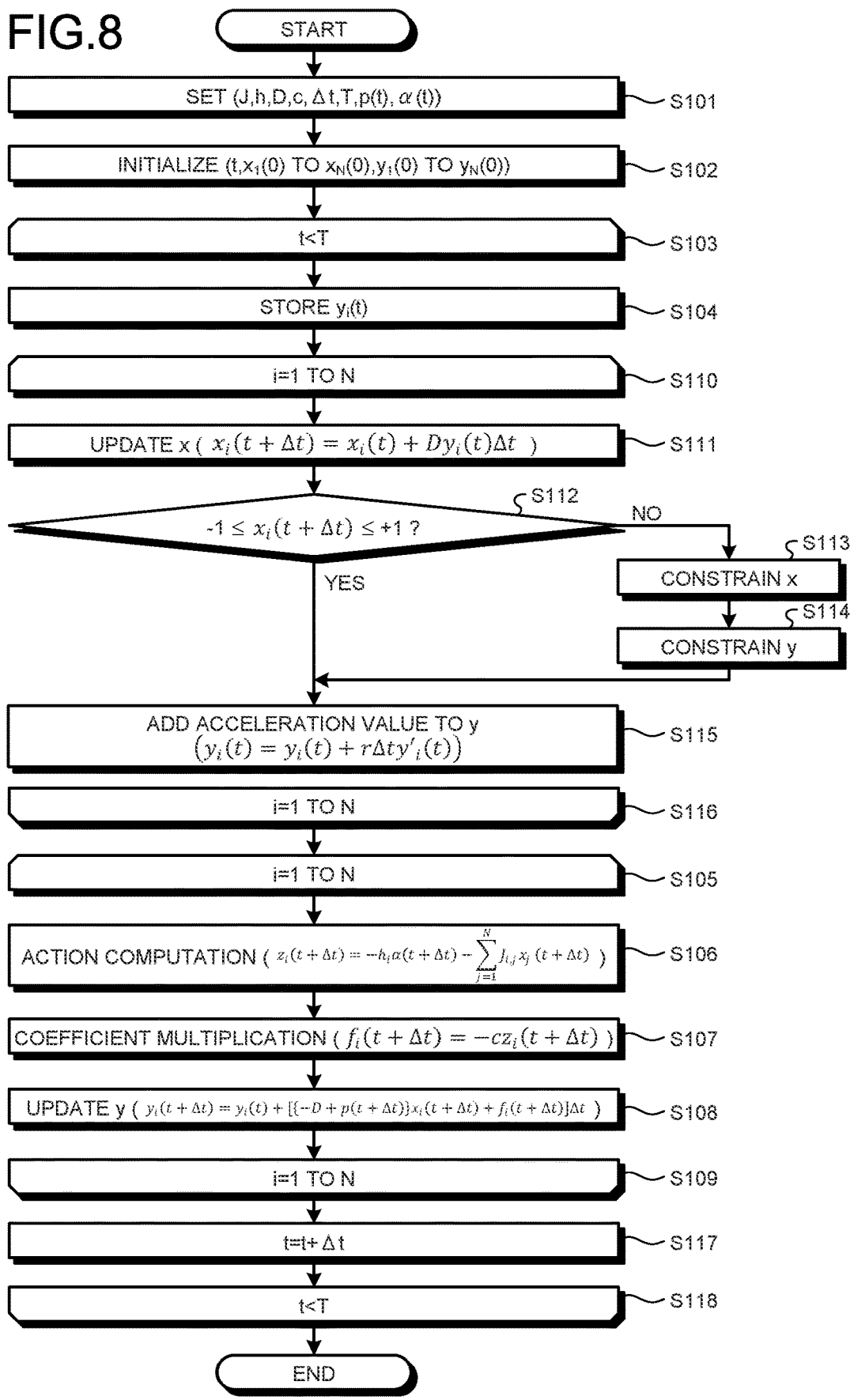
FIG. 8 is a flowchart illustrating a second example of a process of the updating module.

FIG. 8 is a diagram illustrating a second example of a process of the updating module 14. When an optimization problem is solved using the improved algorithm, the updating module 14 may perform a process according to the flow illustrated in FIG. 8, instead of the flow illustrated in FIG. 7. In the flowchart in FIG. 8, the step that performs substantially the same process as the process in the flowchart illustrated in FIG. 7 is denoted by the same step number.

First of all, at S101 and S102, the updating module 14 performs a process similar to that in the first example in FIG. 7. Subsequently, the updating module 14 performs the loop process between S103 and S118, in the same manner as in the first example in FIG. 7.

At S104, the updating module 14 performs a process similar to that in the first example illustrated in FIG. 7.

Subsequently, the updating module 14 repeats the loop process between S110 and S116 while incrementing i by one from i=1 to i=N. In the loop process between S110 and S116, the updating module 14 performs the process for the $i^{th}$ element of N elements as a target element.

At S111, the updating module 14 calculates the first variable ($x_i(t+\Delta t)$) of the target element at the target time (t+$\Delta t$) by adding a value obtained by multiplying the second variable ($y_i(t)$) of the target element at the previous time (t) by the predetermined constant (D) and the unit time ($\Delta t$), to the first variable ($x_i(t)$) of the target element at the previous time (t). Specifically, the updating module 14 calculates Equation (18).

$$x_i(t+\Delta t)=x_i(t)+Dy_i(t)\Delta t \qquad (18)$$

Subsequently, at S112, the updating module 14 determines whether the first variable ($x_i(t+\Delta t)$) of the target element at the target time (t+$\Delta t$) is in a range from a predetermined first value to a predetermined second value, both inclusive. The updating module 14 proceeds to S115 (Yes at S112) if the first variable ($x_i(t+\Delta t)$) of the target element at the target time (t+$\Delta t$) is in the range from the first value to the second value, both inclusive (Yes at S112). The updating module 14 proceeds to S113 if the first variable ($x_i(t+\Delta t)$) of the target element at the target time (t+$\Delta t$) is smaller than the first value or greater than the second value (No at S112).

At S113, the updating module 14 performs a process similar to that in the first example illustrated in FIG. 7. Subsequently to S113, at S114, the updating module 14 performs the constraining process for the second variable ($y_i(t)$) of the target element at the previous time (t). Specifically, the updating module 14 changes the second variable ($y_i(t)$) of the target element at the previous time (t) to the third value. When S114 is finished, the updating module 14 proceeds to S115.

At S115, the updating module 14 adds an acceleration value calculated by a predetermined computation to the second variable ($y_i(t)$) of the target element at the previous time (t). For example, the acceleration value is a value obtained by multiplying the second variable ($y'_i(t)$) at the previous time before performing the constraining process by the product (r$\Delta t$) of the prescribed coefficient (r) and the unit time ($\Delta t$). The updating module 14 stores the second variable ($y'_i(t)$) at the previous time before performing the constraining process in advance at S104. For example, the updating module 14 performs a computation given by Equation (19).

$$y_i(t)=y_i(t)+\{r\Delta t\times y'_i(t)\} \qquad (19)$$

When S115 is finished, the updating module 14 proceeds to S116. The updating module 14 performs the following process by performing the loop process between S110 and S116 as described above N times.

That is, for each of N elements, the updating module 14 updates the first variable ($x_i(t+\Delta t)$) of the target element at the target time (t+$\Delta t$), based on the second variable ($y_i(t)$) of the target element at the previous time (t). Subsequently, for each of N elements, when the first variable ($x_i(t+\Delta t)$) of the target element at the target time (t+$\Delta t$) is smaller than the first value, the updating module 14 changes the first variable ($x_i(t+\Delta t)$) of the target element at the target time (t+$\Delta t$) to the first value. Furthermore, for each of N elements, when the first variable ($x_i(t+\Delta t)$) of the target element at the target time (t+$\Delta t$) is greater than the second value, the updating module 14 changes the first variable ($x_i(t+\Delta t)$) of the target element at the target time (t+$\Delta t$) to the second value. Furthermore, for each of N elements, when the first variable ($x_i(t+\Delta t)$) of the target element at the target time (t+$\Delta t$) is smaller than the first value or greater than the second value, the updating module 14 changes the second variable ($y_i(t)$) of the target element at the previous time (t) to the third value. Furthermore, for each of N elements, the updating module 14 adds an acceleration value obtained by multiplying the second variable ($y_i(t)$) of the target element at the previous time (t) before performing the constraining process by the product (r$\Delta t$) of the prescribed coefficient (r) and the unit time ($\Delta t$), to the second variable ($y_i(t)$) of the target element at the previous time (t).

If the loop process between S110 and S116 is performed N times, the updating module 14 proceeds to S105.

Subsequently, the updating module 14 repeats the loop process between S105 and S109 while incrementing i by one from i=1 to i=N.

At S106, the updating module 14 calculates an update value ($z_i(t+\Delta t)$), based on the first variable ($x_1(t+\Delta t)$ to $x_N(t+\Delta t)$) at the target time (t+$\Delta t$) for each of N elements and a predetermined action coefficient for each of sets of the target element and each of N elements.

In the case of a QUBO problem, the updating module 14 calculates Equation (20).

$$z_i(t+\Delta t) = -h_i\alpha(t+\Delta t) - \sum_{j=1}^{N} J_{i,j}x_j(t+\Delta t) \qquad (20)$$

In the case of a HOBO problem, the updating module 14 calculates Equation (21).

$$z_i(t+\Delta t) = J_i^{(1)}\alpha(t+\Delta t) + \sum_{j=1}^{N} J_{i,j}^{(2)}x_j(t+\Delta t) + \sum_{j=1}^{N}\sum_{k=1}^{N} J_{i,j,k}^{(3)}x_j(t+\Delta t)x_k(t+\Delta t) + \ldots \qquad (21)$$

Subsequently, at S107, the updating module 14 calculates the external force ($f_i(t+\Delta t)$) by multiplying the update value ($z_i(t+\Delta t)$) by the coefficient (c). Specifically, the updating module 14 calculates Equation (22).

$$f_i(t+\Delta t)=-cz_i(t+\Delta t) \qquad (22)$$

Subsequently, at S108, the updating module 14 calculates the second variable ($y_i(t+A)$) of the target element at the target time (t+$\Delta t$) by adding a value obtained by multiplying a value based on the external force ($f_i(t)$) and the first variable ($x_i(t+A)$) of the target element at the target time (t+A) by the unit time ($\Delta t$), to the second variable ($y_i(t)$) of the target element at the previous time (t). Specifically, the updating module 14 calculates Equation (23).

$$y_i(t+\Delta t)=y_i(t)+[\{-D+p(t+\Delta t)\}x_i(t+\Delta t)+f_i(t+\Delta t)]\Delta t \quad (23)$$

For each of N elements, the updating module 14 updates the second variable ($y_i(t+\Delta t)$) at the target time (t+$\Delta t$), based on the first variable ($x_1(t+\Delta t)$ to $x_N(t+\Delta t)$) at the target time (t+$\Delta t$), by performing the loop process between S105 and S109 as described above N times.

If the loop process between S105 and S109 is performed N times, the updating module 14 proceeds to S117.

At S117, the updating module 14 updates the target time (t+$\Delta t$) by adding the unit time ($\Delta t$) to the previous time (t). At S118, the updating module 14 repeats the process from S104 to S117 until t exceeds the end time (T). When t becomes greater than the end time (T), the updating module 14 terminates this flow.

Then, for each of N elements, the updating module 14 calculates the value of the corresponding spin, in accordance with the sign of the first variable ($x_i(T)$) at the end time (t=T).

By performing the process in accordance with the flowchart illustrated in FIG. 8, for each of N elements, the updating module 14 alternately updates the first variable ($x_i(t+\Delta t)$) and the second variable ($y_i(t+\Delta t)$), sequentially for each unit time from the initial time (t=0) to the end time (t=T). By performing the process in accordance with the flowchart in FIG. 8, in the updating process for each unit time, for each of N elements, the updating module 14 calculates the second variable ($y_i(t+\Delta t)$) at the target time (t+$\Delta t$) after calculating the first variable ($x_i(t+\Delta t)$) at the target time (t+$\Delta t$). By performing the process in accordance with the flowchart in FIG. 8, in the updating process for each unit time, for each of N elements, the updating module 14 adds the acceleration value to the second variable ($y_i(t)$) at the previous time (t) after updating the first variable ($x_i(t+\Delta t)$) and before updating the second variable ($y_i(t+\Delta t)$) at the target time (t+$\Delta t$).

As described above, the updating module 14 can calculate N first variables ($x_1(t)$ to $x_N(t)$) and N second variables ($y_1(t)$ to $y_N(t)$) at the end time (t=T) by performing a computation in accordance with the improved algorithm using the symplectic Euler method.

The updating module 14 performs the process at S110 to S116 for each of N elements. The updating module 14 may allow $M_1$ (where $M_1$ is an integer of 2 through N, both inclusive) computation processing devices such as processing circuits, processors, computers, or servers to perform these processes in parallel. For example, $M_1$ is a divisor of N. In this case, each of N elements corresponds to any one of $M_1$ computation processing devices. Then, each of $M_1$ computation processing devices performs the process at S110 to S116 for the corresponding element among N elements. By performing such a process, the updating module 14 allows a plurality of circuits such as FPGAs to perform these processes in a distributed manner and thereby obtains a processing result at high speed.

Furthermore, the updating module 14 also performs the process at S105 to S109 for each of N elements. The updating module 14 may allow $M_2$ computation processing devices such as processing circuits, processors, computers, or servers to perform these processes in parallel. For example, $M_2$ is a divisor of N. In this case, each of N elements corresponds to any one of $M_2$ computation processing devices. Then, each of $M_2$ computation processing devices performs the process at S105 to S109 for the corresponding element among N elements. By performing such a process, the updating module 14 allows a plurality of circuits such as FPGAs to perform these processes in a distributed manner and thereby obtains a processing result at high speed.

Computing Circuit

Figure 9:
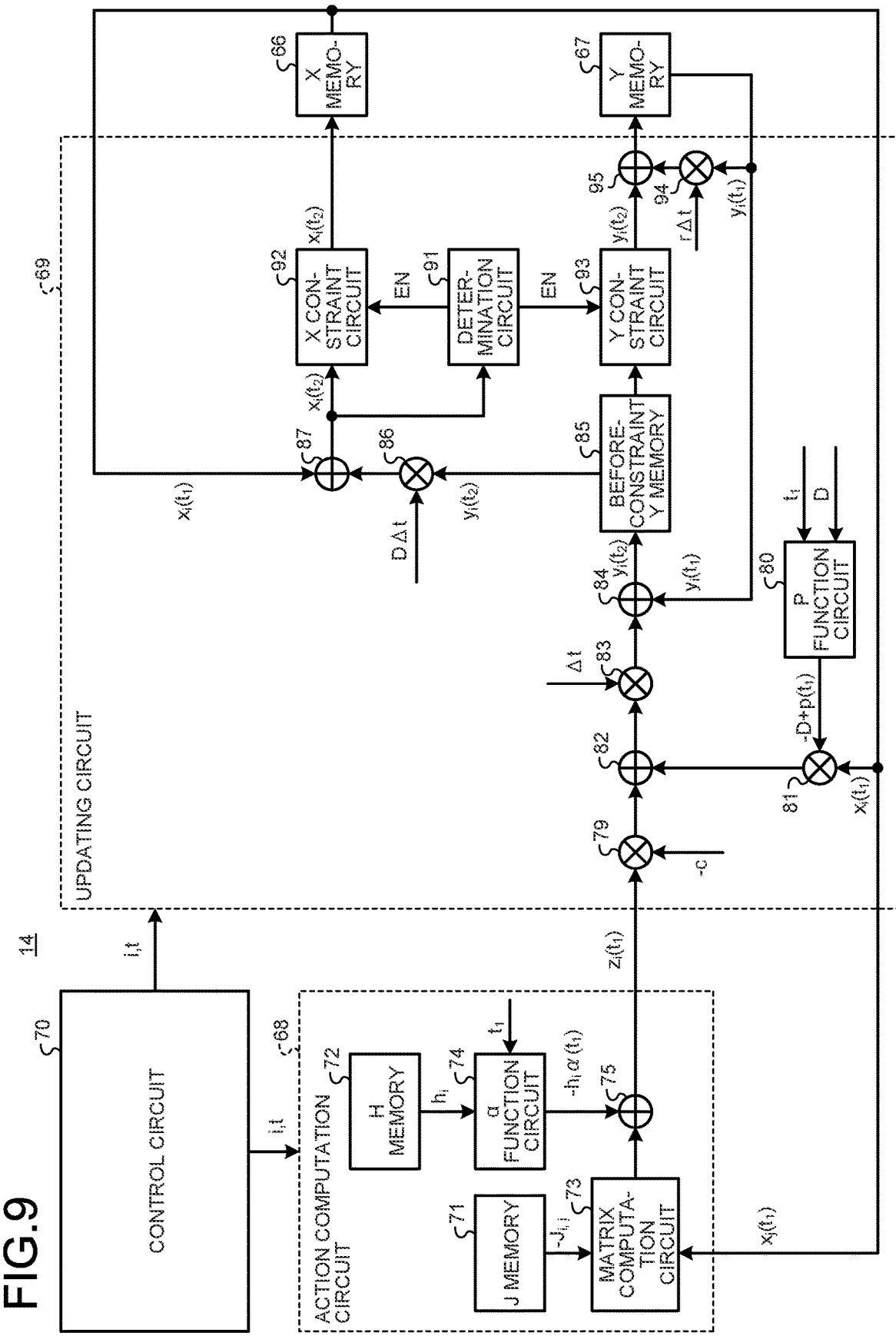
FIG. 9 is a block configuration diagram of the updating module.

FIG. 9 is a diagram illustrating a block configuration of the updating module 14 implemented in circuitry. The updating module 14 implemented in circuitry is configured as illustrated in FIG. 9 as an example. In the description of FIG. 9, the previous time is denoted by $t_1$. The target time is denoted by $t_2$.

The updating module 14 illustrated in FIG. 9 executes the improved algorithm given by Equation (9) and Equation (10). The updating module 14 includes an X memory 66, a Y memory 67, an action computation circuit 68, an updating circuit 69, and a control circuit 70.

The X memory 66 stores N first variables ($x_i(t_1)$) at the previous time ($t_1$). The N first variables ($x_i(t_1)$) at the previous time ($t_1$) stored in the X memory 66 are overwritten with updating of the time. That is, when N first variables ($x_i(t_2)$) at the target time ($t_2$) are calculated, the calculated N first variables ($x_i(t_2)$) at the target time ($t_2$) are written into the X memory 66 as new N first variables ($x_i(t_1)$) at the previous time ($t_1$). Prior to computation, the control circuit 70 writes N first variables $x_i$ at the initial time into the X memory 66.

The Y memory 67 stores N second variables ($y_i(t_1)$) at the previous time ($t_1$). N second variables ($y_i(t_1)$) at the previous time ($t_1$) stored in the Y memory 67 are overwritten with updating of the time. That is, when N second variables ($y_i(t_2)$) at the target time ($t_2$) are calculated, the calculated N second variables ($y_i(t_2)$) at the target time ($t_2$) are written into the Y memory 67 as new N second variables ($y_i(t_1)$) at the previous time ($t_1$). Prior to computation, the control circuit 70 writes N second variables $y_i$ at the initial time into the Y memory 67.

The action computation circuit 68 acquires N first variables ($x_j(t_1)$) at the previous time ($t_1$) from the X memory 66. Then, for each of N elements, the action computation circuit 68 calculates the update value ($z_i(t_1)$).

For each of N elements, the updating circuit 69 acquires the update value ($z_i(t_1)$) from the action computation circuit 68. Furthermore, for each of N elements, the updating circuit 69 acquires the first variable ($x_i(t_1)$) at the previous time ($t_1$) from the X memory 66 and acquires the second variable ($y_i(t_1)$) at the previous time ($t_1$) from the Y memory 67. Then, for each of N elements, the updating circuit 69 calculates the first variable ($x_i(t_2)$) at the target time ($t_2$) and overwrites the first variable ($x_i(t_1)$) at the previous time ($t_1$) stored in the X memory 66. In addition, for each of N elements, the updating circuit 69 calculates the second variable ($y_i(t_2)$) at the target time ($t_2$) and overwrites the second variable ($y_i(t_1)$) at the previous time ($t_1$) stored in the Y memory 67.

The control circuit 70 sequentially updates the target time ($t_2$) for each unit time ($\Delta t$) to allow the action computation circuit 68 and the updating circuit 69 to sequentially calculate the first variable ($x_i(t)$) and the second variable ($y_i(t)$) for each unit time ($\Delta t$).

Furthermore, the control circuit 70 generates an index (i) by incrementing from 1 to N and allows the action computation circuit 68 and the updating circuit 69 to calculate the first variable ($x_i(t_2)$) at the target time ($t_2$) and the second variable ($y_i(t_2)$) at the target time ($t_2$) corresponding to each of N elements, in the order of index. The action computation circuit 68 and the updating circuit 69 may calculate a plurality of first variables ($x_i(t_2)$) and a plurality of second variables ($y_i(t_2)$) corresponding to a plurality of indices, in parallel.

The action computation circuit 68 includes a J memory 71, an H memory 72, a matrix computation circuit 73, an α function circuit 74, and a first adder circuit 75.

The J memory 71 stores an N×N matrix including (N×N) coupling coefficients. $J_{i,j}$ denotes the coupling coefficient at the $i^{th}$ row and the $j^{th}$ column included in the matrix. $J_{i,j}$ denotes the coupling coefficient between the $i^{th}$ spin and the $j^{th}$ spin in the Ising model corresponding to a combinatorial optimization problem. Prior to computation, the control circuit 70 writes a matrix generated by a user or the like in advance into the J memory 71.

The H memory 72 stores an array including N local magnetic field coefficients. $h_i$ denotes the $i^{th}$ local magnetic field coefficient included in the array. $h_i$ denotes the local magnetic field acting on the $i^{th}$ spin in the Ising model corresponding to a combinatorial optimization problem. Prior to computation, the control circuit 70 writes an array generated by a user or the like in advance into the H memory 72.

The matrix computation circuit 73 acquires N first variables ($x_j(t_1)$) at the previous time ($t_1$) from the X memory 66. The matrix computation circuit 73 acquires, for each of N elements, N coupling coefficients $J_{i,j}$ included in a target row from the J memory 71. Then, the matrix computation circuit 73 performs, for each of N elements, a product-sum operation of N first variables ($x_j(t_1)$) at the previous time ($t_1$) and N coupling coefficients $J_{i,j}$ included in the target row.

The α function circuit 74 acquires, for each of N elements, the target local magnetic field coefficient $h_i$ from the H memory 72. The α function circuit 74 performs, for each of N elements, a computation $\{-h_i\alpha(t_1)\}$, where $\alpha(t)$ is a preset function.

The first adder circuit 75 adds, for each of N elements, the result of the product-sum operation by the matrix computation circuit 73 to the computation result by the α function circuit 74. With this computation, the first adder circuit 75 outputs, for each of N elements, the update value ($z_i(t_1)$) at the previous time ($t_1$) given by Equation (24).

$$z_i(t_1) = -h_i\alpha(t_1) - \sum_{j=1}^{N} J_{i,j} x_j(t_1) \quad (24)$$

The updating circuit 69 includes a first multiplier circuit 79, a P function circuit 80, a second multiplier circuit 81, a second adder circuit 82, a third multiplier circuit 83, a third adder circuit 84, a before-constraint Y memory 85, a fourth multiplier circuit 86, a fourth adder circuit 87, a determination circuit 91, an X constraint circuit 92, a Y constraint circuit 93, an acceleration value calculation circuit 94, and an acceleration value addition circuit 95.

The first multiplier circuit 79 multiplies, for each of N elements, the update value ($z_i(t_1)$) by a coefficient -c. The P function circuit 80 performs, for each of N elements, a computation of $\{-D+p(t_1)\}$. The second multiplier circuit 81 acquires, for each of N elements, the first variable ($x_i(t_1)$) at the previous time ($t_1$) from the X memory 66. Then, the second multiplier circuit 81 multiplies, for each of N elements, the first variable ($x_i(t_1)$) at the previous time ($t_1$) by the computation result in the P function circuit 80.

The second adder circuit 82 adds, for each of N elements, the computation result in the first multiplier circuit 79 to the computation result in the second multiplier circuit 81. The third multiplier circuit 83 multiplies the computation result in the second adder circuit 82 by the unit time $\Delta t$.

The third adder circuit 84 acquires, for each of N elements, the second variable ($y_i(t_1)$) at the previous time ($t_1$) from the Y memory 67. The third adder circuit 84 adds, for each of N elements, the second variable ($y_i(t_1)$) at the previous time ($t_1$) to the computation result in the third multiplier circuit 83. With this computation, the third adder circuit 84 outputs, for each of N elements, the second variable ($y_i(t_2)$) at the target time ($t_2$) given by Equation (25).

$$y_i(t_2)=y_i(t_1)+[\{-D+p(t_1)\}x_i(t)-cz_i(t_1)]\Delta t \quad (25)$$

Then, the third adder circuit 84 writes the calculated second variable ($y_i(t_2)$) at the target time ($t_2$) for each of N elements into the before-constraint Y memory 85. The before-constraint Y memory 85 stores N second variables ($y_i(t_2)$) at the target time ($t_2$) before constraint by the Y constraint circuit 93.

The fourth multiplier circuit 86 acquires, for each of N elements, the second variable ($y_i(t_2)$) before constraint at the target time ($t_2$) from the before-constraint Y memory 85. The fourth multiplier circuit 86 multiplies, for each of N elements, the second variable ($y_i(t_2)$) before constraint at the target time ($t_2$) by $\{D\Delta t\}$.

The fourth adder circuit 87 acquires, for each of N elements, the first variable ($x_i(t_1)$) at the previous time ($t_1$) from the X memory 66. The fourth adder circuit 87 adds, for each of N elements, the first variable ($x_i(t_1)$) at the previous time ($t_1$) to the computation result in the fourth multiplier circuit 86. With this computation, the fourth adder circuit 87 outputs, for each of N elements, the first variable ($x_i(t_2)$) at the target time ($t_2$) given by Equation (26).

$$x_i(t_2)=x_i(t_1)+Dy_i(t_2)\Delta t \quad (26)$$

The determination circuit 91 determines, for each of N elements, whether the first variable ($x_i(t_2)$) at the target time ($t_2$) calculated by the fourth adder circuit 87 is in a range from a predetermined first value to a predetermined second value, both inclusive. For example, the first value is −1. The second value is +1. When the first variable ($x_i(t_2)$) at the target time ($t_2$) is smaller than the first value or greater than the second value, the determination circuit 91 applies an enable signal (EN) to the X constraint circuit 92 and the Y constraint circuit 93.

The X constraint circuit 92 receives, for each of N elements, the first variable ($x_i(t_2)$) at the target time ($t_2$) calculated by the fourth adder circuit 87. For each of N elements, when an enable signal (EN) is not received from the determination circuit 91, the X constraint circuit 92 writes the first variable ($x_i(t_2)$) at the target time ($t_2$) calculated by the fourth adder circuit 87 as it is into the X memory 66.

For each of N elements, when an enable signal (EN) is received from the determination circuit 91, the X constraint circuit 92 performs the constraining process for the first variable ($x_i(t_2)$) at the target time ($t_2$) calculated by the fourth adder circuit 87 and writes the first variable ($x_i(t_2)$) subjected to the constraining process into the X memory 66.

When the first variable ($x_i(t_2)$) at the target time ($t_2$) is smaller than the first value (for example, −1), the X constraint circuit 92 changes the first variable ($x_i(t_2)$) at the target time ($t_2$) to the first value (for example, −1), as the constraining process. When the first variable ($x_i(t_2)$) at the target time ($t_2$) is greater than the second value (for example, +1), the X constraint circuit 92 changes the first variable ($x_i(t_2)$) at the target time ($t_2$) to the second value (for example, +1), as the constraining process.

The Y constraint circuit 93 acquires, for each of N elements, the second variable ($y_i(t_2)$) at the target time ($t_2$) from the before-constraint Y memory 85. For each of N elements, when an enable signal (EN) is not received from the determination circuit 91, the Y constraint circuit 93 outputs the second variable ($y_i(t_2)$) at the target time ($t_2$) acquired from the before-constraint Y memory 85 as it is.

For each of N elements, when an enable signal (EN) is received from the determination circuit 91, the Y constraint circuit 93 performs the constraining process for the second variable ($y_i(t_2)$) at the target time ($t_2$) acquired from the before-constraint Y memory 85 and outputs the second variable ($y_i(t_2)$) subjected to the constraining process.

Here, the Y constraint circuit 93 changes the second variable ($y_i(t_2)$) at the target time ($t_2$) to the third value (for example, 0), as the constraining process. The Y constraint circuit 93 may change the second variable ($y_i(t_2)$) to a random number from the first value to the second value, both inclusive, as the constraining process.

The acceleration value calculation circuit 94 acquires, for each of N elements, the second variable ($y_i(t_1)$) at the previous time ($t_1$) from the Y memory 67. Furthermore, the acceleration value calculation circuit 94 receives the prescribed coefficient (r) from the control circuit 70 prior to computation. For example, the prescribed coefficient (r) is a value greater than 0 and smaller than 1. The acceleration value calculation circuit 94 then calculates an acceleration value, for each of N elements, by multiplying the second variable ($y_i(t_1)$) at the previous time ($t_1$) by the product ($r\Delta t$) of the prescribed coefficient (r) and the unit time ($\Delta t$).

The acceleration value addition circuit 95 acquires, for each of N elements, the second variable ($y_i(t_2)$) at the target time ($t_2$) from the Y constraint circuit 93. Furthermore, the acceleration value addition circuit 95 acquires, for each of N elements, the acceleration value ($r\Delta t \times (y_i(t_1))$) from the acceleration value calculation circuit 94. The acceleration value addition circuit 95 adds, for each of N elements, the acceleration value ($r\Delta t \times (y_i(t_1))$) to the second variable ($y_i(t_2)$) at the target time ($t_2$). The acceleration value addition circuit 95 then writes the second variable ($y_i(t_2)$) at the target time ($t_2$) added with the acceleration value ($r\Delta t \times (y_i(t_1))$) into the Y memory 67.

As described above, the updating module 14 can calculate N first variables ($x_i(T)$) and N second variables ($y_i(T)$) at the end time (T) by executing the improved algorithm in Equation (9).

The updating module 14 described above calculates, for each unit time, the first variable ($x_i(t_2)$) at the target time ($t_2$) after calculating the second variable ($y_i(t_2)$) at the target time ($t_2$). Instead of this, the updating module 14 may calculate, for each unit time, the second variable ($y_i(t_2)$) at the target time ($t_2$) after calculating the first variable ($x_i(t_2)$) at the target time ($t_2$).

In this case, the before-constraint Y memory 85 stores N second variables ($y_i(t_1)$) at the previous time ($t_1$) before constraint by the Y constraint circuit 93. Then, the fourth adder circuit 87 outputs, for each of N elements, the first variable ($x_i(t_2)$) at the target time ($t_2$) given by Equation (27).

$$x_i(t_2) = x_i(t_1) + Dy_i(t_1)\Delta t \qquad (27)$$

The matrix computation circuit 73 acquires N first variables ($x_j(t_2)$) at the target time ($t_2$) from the X memory 66.

The first adder circuit 75 then outputs, for each of N elements, the update value ($z_i(t_2)$) at the target time ($t_2$) given by Equation (28).

$$z_i(t_2) = -h_i\alpha(t_2) - \sum_{j=1}^{N} J_{i,j}x_j(t_2) \qquad (28)$$

The first multiplier circuit 79 multiplies, for each of N elements, the update value ($z_i(t_2)$) at the target time ($t_2$) by $-c$. The P function circuit 80 performs, for each of N elements, a computation of $\{-D+p(t_2)\}$. The second multiplier circuit 81 multiplies, for each of N elements, the first variable ($x_i(t_2)$) at the previous time ($t_2$) by the computation result in the P function circuit 80.

The third adder circuit 84 then outputs, for each of N elements, the second variable ($y_i(t_2)$) at the target time ($t_2$) given by Equation (29).

$$y_i(t_2) = y_i(t_1) + [\{-D+p(t_2)\}x_i(t_2) - cz_i(t_2)]\Delta t \qquad (29)$$

Even with such a process, the updating module 14 can calculate N first variables ($x_i(T)$) and N second variables ($y_i(T)$) at the end time (T) by executing the improved algorithm.

The updating circuit 69 performs, for each of N elements, an X updating process of updating the first variable ($x_i(t_1)$) based on the second variable ($y_i(t_1)$), an X constraining process of changing the first variable ($x_i(t_2)$) to the first value or the second value, a Y constraining process of changing the second variable ($y_i(t_2)$) to the third value, and an acceleration value adding process of adding the acceleration value ($r\Delta t \times (y_i(t_1))$) to the second variable ($y_i(t_2)$). The updating circuit 69 may perform these processes with $M_1$ processing circuits in parallel. In this case, each of N elements corresponds to any one of $M_1$ processing circuits. Then, each of $M_1$ processing circuits performs, for the corresponding element among N elements, the X updating process, the X constraining process, the Y constraining process, and the acceleration value adding process. By performing such a process, the updating circuit 69 allows a plurality of processing circuits to perform these processes in a distributed manner and thereby obtains a processing result at high speed.

Furthermore, the action computation circuit 68 calculates, for each of N elements, the update value ($z_i(t_1)$). The action computation circuit 68 may allow $M_2$ processing circuits to perform the process of calculating the update value ($z_i(t_1)$) in parallel. In this case, each of N elements corresponds to any one of $M_2$ processing circuits. Then, each of $M_2$ processing circuits performs the process of calculating the update value ($z_i(t_1)$) for the corresponding element among N elements. When the action computation circuit 68 is parallelized, the degree of parallelism of the matrix computation circuit 73, the degree of parallelism of the $\alpha$ function circuit 74, and the degree of parallelism of the first adder circuit 75 may vary, or only the matrix computation circuit 73 may be parallelized. By performing such a process, the action computation circuit 68 allows a plurality of processing circuits to perform the process of calculating the update value ($z_i(t_1)$) in a distributed manner and thereby obtains a processing result at high speed. In particular, with the parallelization of the matrix computation circuit 73, the action computation circuit 68 can efficiently perform an enormous amount of multiplication and addition processes involved with the matrix computation.

System Configuration

Figure 10:
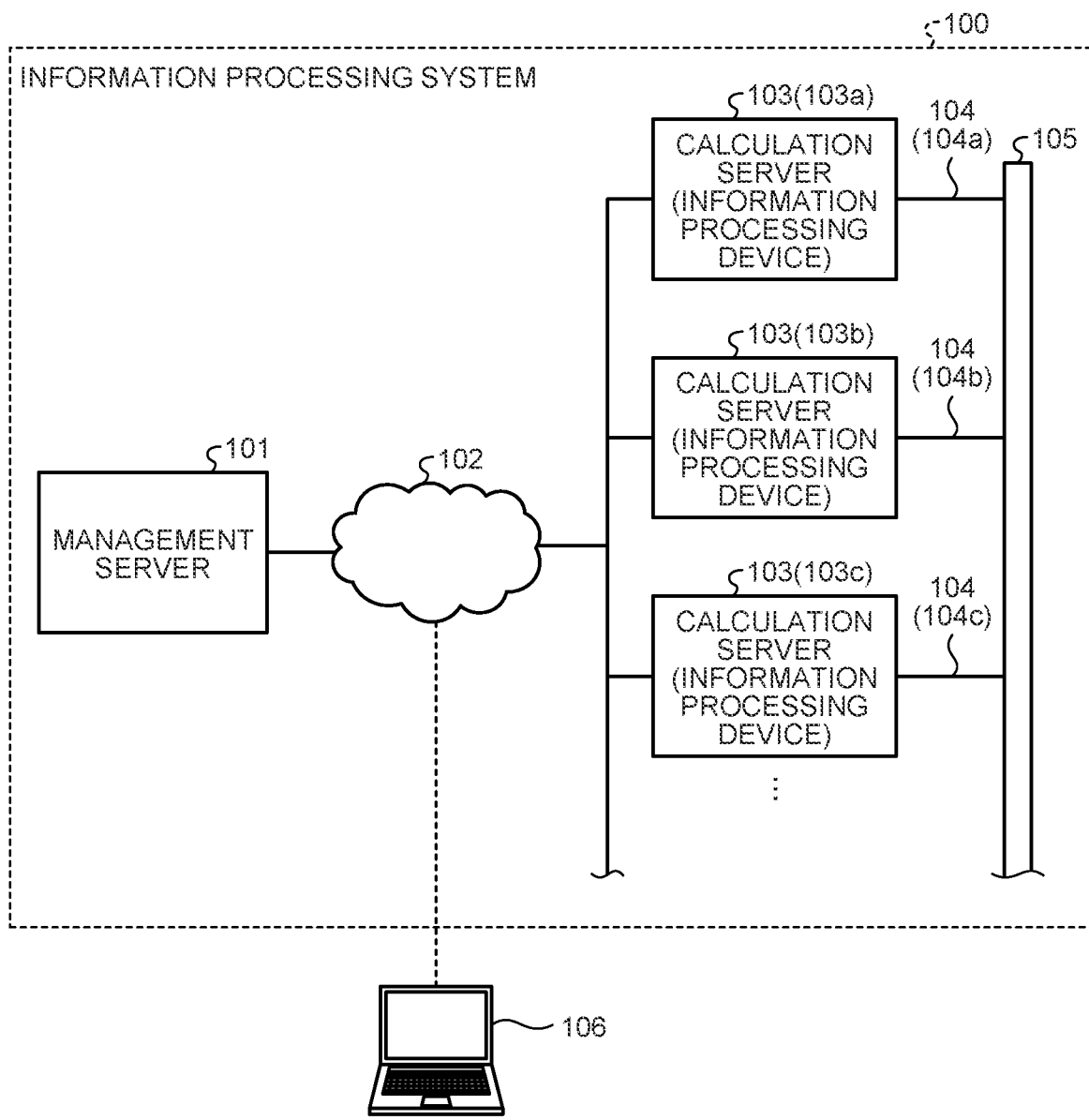
FIG. 10 is a configuration diagram of an information processing system.

FIG. 10 is a diagram illustrating a configuration of an information processing system 100. The improved algorithm can be executed by, for example, the information processing system 100 as illustrated in FIG. 10. The information processing system 100 thus can solve a large-scale combinatorial optimization problem at high speed through parallel processing.

The information processing system 100 includes a management server 101, a network 102, a plurality of calculation servers 103 (103a to 103c) (information processing devices), a plurality of cables 104 (104a to 104c), and a switch 105. A terminal device 106 can communicate with the information processing system 100. The management server 101, the calculation servers 103 (103a to 103c), and the terminal device 106 perform data communication with each other through the network 102. The network 102 is, for example, the Internet in which a plurality of computer networks are connected to each other. The network 102 may be a communication medium either wired or wireless or a combination thereof.

The calculation servers 103 (103a to 103c) are connected to the switch 105 through the cables 104 (104a to 104c). The cables 104 (104a to 104c) and the switch 105 form an interconnection between the calculation servers 103. The calculation servers 103 (103a to 103c) can perform data communication with each other through the interconnection. The switch 105 is, for example, an InfiniBand switch. The cables 104a to 104c are, for example, InfiniBand cables. However, the switch 105 and the cables 104 may be wired LAN switch/cables. Any communication standards and communication protocol may be used in the cables 104 and the switch 105. The terminal device 106 is, for example, a notebook PC, a desktop PC, a smartphone, a tablet, or a vehicle-mounted terminal device.

The process of solving a combinatorial optimization problem using the improved algorithm can be performed in parallel and in a distributed manner. Therefore, the calculation servers 103 (103a to 103c) and/or the processors of the calculation servers 103 (103a to 103c) may share and execute some of the steps of some calculation processes in the process of solving a combinatorial optimization problem using the improved algorithm or may perform the same calculation process for different variables in parallel. In this case, the management server 101, for example, converts a combinatorial optimization problem input by a user into a format that can be processed by the calculation servers 103 and allows the calculation servers 103 to perform a process. The management server 101 then acquires the calculation results from the calculation servers 103 and converts the consolidated calculation result into the solution to the combinatorial optimization problem.

FIG. 10 illustrates three calculation servers 103 (103a to 103c). However, the number of calculation servers 103 included in the information processing system 100 is not limited to three. For example, the information processing system 100 may include one, two, four, or more calculation servers 103. The information processing system 100 may perform the process of solving a combinatorial optimization problem using some of the included calculation servers 103. The calculation server 103 may be any kind of information processing device. For example, the calculation server 103 may be a server installed in a datacenter or may be a desktop PC installed in an office. The calculation server 103 may be computers of different kinds installed at different locations.

For example, the calculation server 103 may be a general-purpose computer, or may be a dedicated electronic circuit or a combination thereof.

Figure 11:
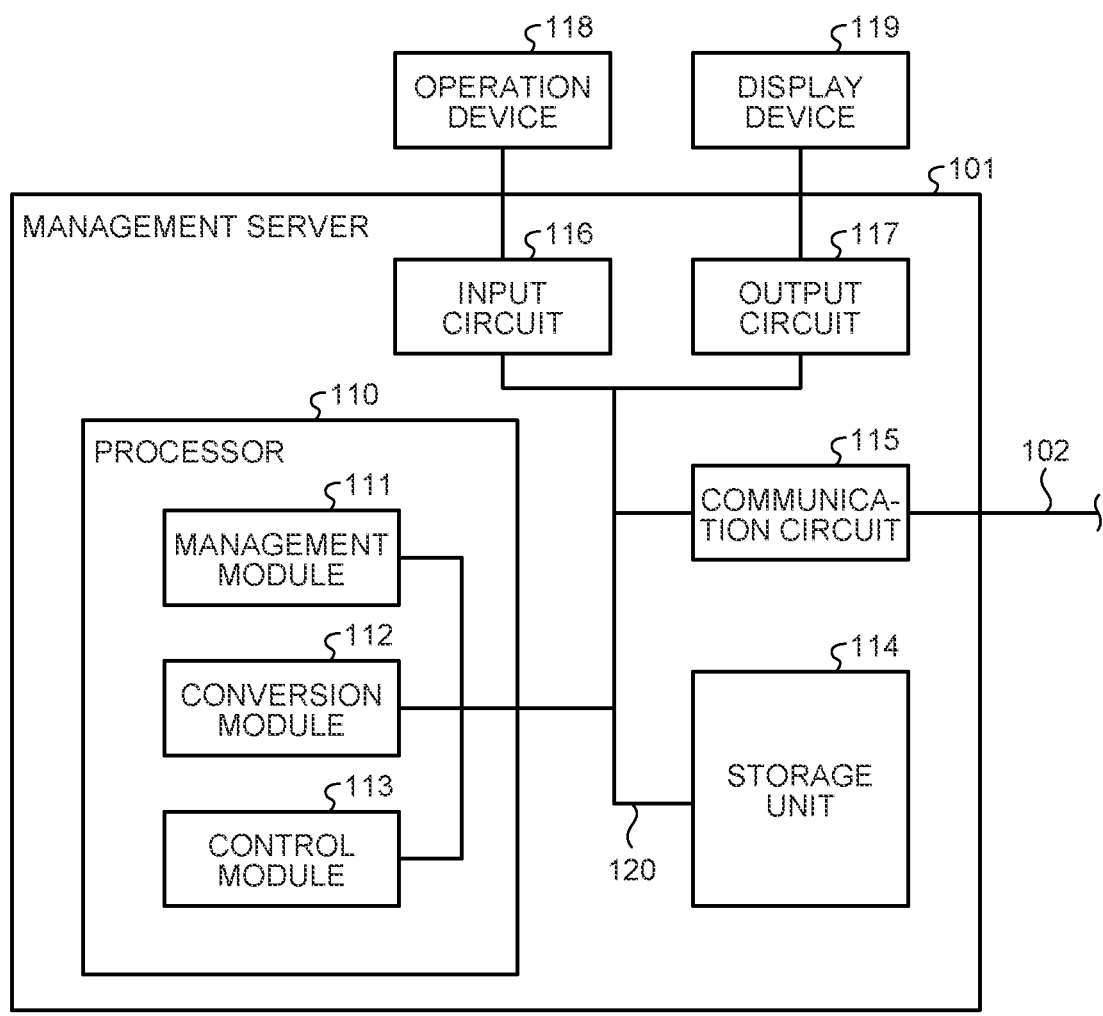
FIG. 11 is a configuration diagram of a management server.

FIG. 11 is a diagram illustrating a configuration of the management server 101. The management server 101 is, for example, a computer including a central processing unit (CPU) and a memory. The management server 101 includes a processor 110, a storage unit 114, a communication circuit 115, an input circuit 116, and an output circuit 117. The processor 110, the storage unit 114, the communication circuit 115, the input circuit 116, and the output circuit 117 are connected to each other through a bus 120. The processor 110 includes, as an internal functional configuration, a management module 111, a conversion module 112, and a control module 113.

The processor 110 is an electronic circuit that performs a computation and controls the management server 101. The processor 110 may be, for example, a CPU, a microprocessor, an ASIC, an FPGA, a PLD, or a combination thereof. The management module 111 provides an interface for operating the management server 101 through the user's terminal device 106. The interface provided by the management module 111 is, for example, an API, a CLI, or a webpage. For example, the user inputs information on a combinatorial optimization problem or views and/or downloads the calculated solution to the combinatorial optimization problem through the management module 111. The conversion module 112 receives parameters for a combinatorial optimization problem and converts the input parameters into a form that can be processed by each calculation server 103. The control module 113 transmits a control command to each calculation server 103. After the control module 113 acquires a calculation result from each calculation server 103, the conversion module 112 consolidates a plurality of calculation results, converts the consolidated calculation result into a solution to the combinatorial optimization problem, and outputs the solution to the combinatorial optimization problem.

The storage unit 114 stores a computer program for the management server 101 and a variety of data including data necessary for executing the computer program and data generated by the computer program. The computer program includes both an OS and an application. The storage unit 114 may be a volatile memory, a nonvolatile memory, or a combination thereof. The volatile memory is, for example, a DRAM or an SRAM. The nonvolatile memory is, for example, a NAND flash memory, an NOR flash memory, an ReRAM, or an MRAM. Alternatively, the storage unit 114 may be a hard disk, an optical disk, a magnetic tape, or an external storage device.

The communication circuit 115 transmits/receives data to/from the devices connected to the network 102. The communication circuit 115 is, for example, a network interface card (NIC) for a wired LAN. However, the communication circuit 115 may be any other kind of communication circuit, such as a wireless LAN. The input circuit 116 implements data input to the management server 101. The input circuit 116 includes, for example, USB or PCI-Express as an external port. An operation device 118 is connected to the input circuit 116. The operation device 118 is a device for the user to input information to the management server 101. The operation device 118 is, for example, but not limited to, a keyboard, a mouse, a touch panel, or a voice recognition device. The output circuit 117 implements data output from the management server 101. The output circuit 117 includes, for example, HDMI (registered trademark) or DisplayPort as an external port. For example, a display device 119 is connected to the output circuit 117. The display device 119 is, for example, but not limited to, a liquid crystal display (LCD), an organic electroluminescent (EL) display, or a projector.

An administrator can perform maintenance of the management server 101, using the operation device 118 and the display device 119. The operation device 118 and the display device 119 may be built in the management server 101. The operation device 118 and the display device 119 are not necessarily connected to the management server 101. For example, the administrator may perform maintenance of the management server 101, using a terminal device capable of communicating with the network 102.

Figure 12:
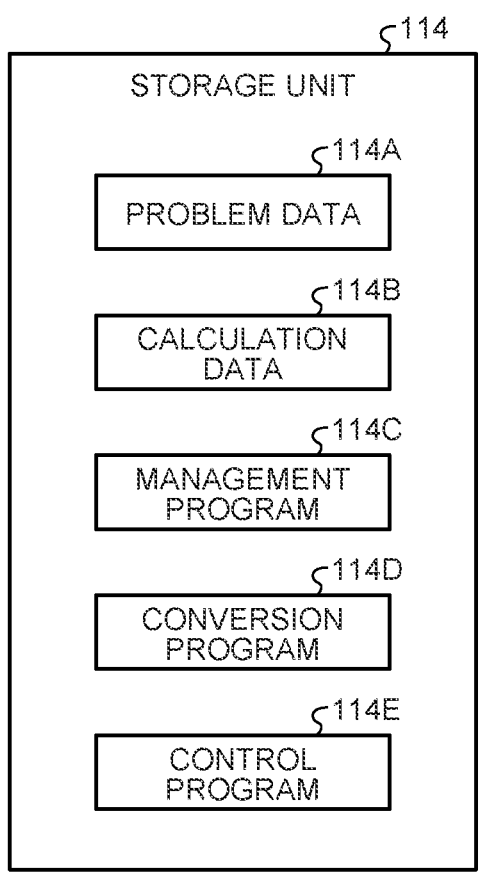
FIG. 12 is a diagram illustrating data stored in a storage unit.

FIG. 12 is a diagram illustrating data stored in the storage unit 114 of the management server 101. The storage unit 114 stores, for example, problem data 114A, calculation data 114B, a management program 114C, a conversion program 114D, and a control program 114E. For example, the problem data 114A includes data of a combinatorial optimization problem. For example, the calculation data 114B includes a calculation result collected from each calculation server 103. For example, the management program 114C is a computer program that implements the function of the management module 111. For example, the conversion program 114D is a computer program that implements the function of the conversion module 112. For example, the control program 114E is a computer program that implements the function of the control module 113.

Figure 13:
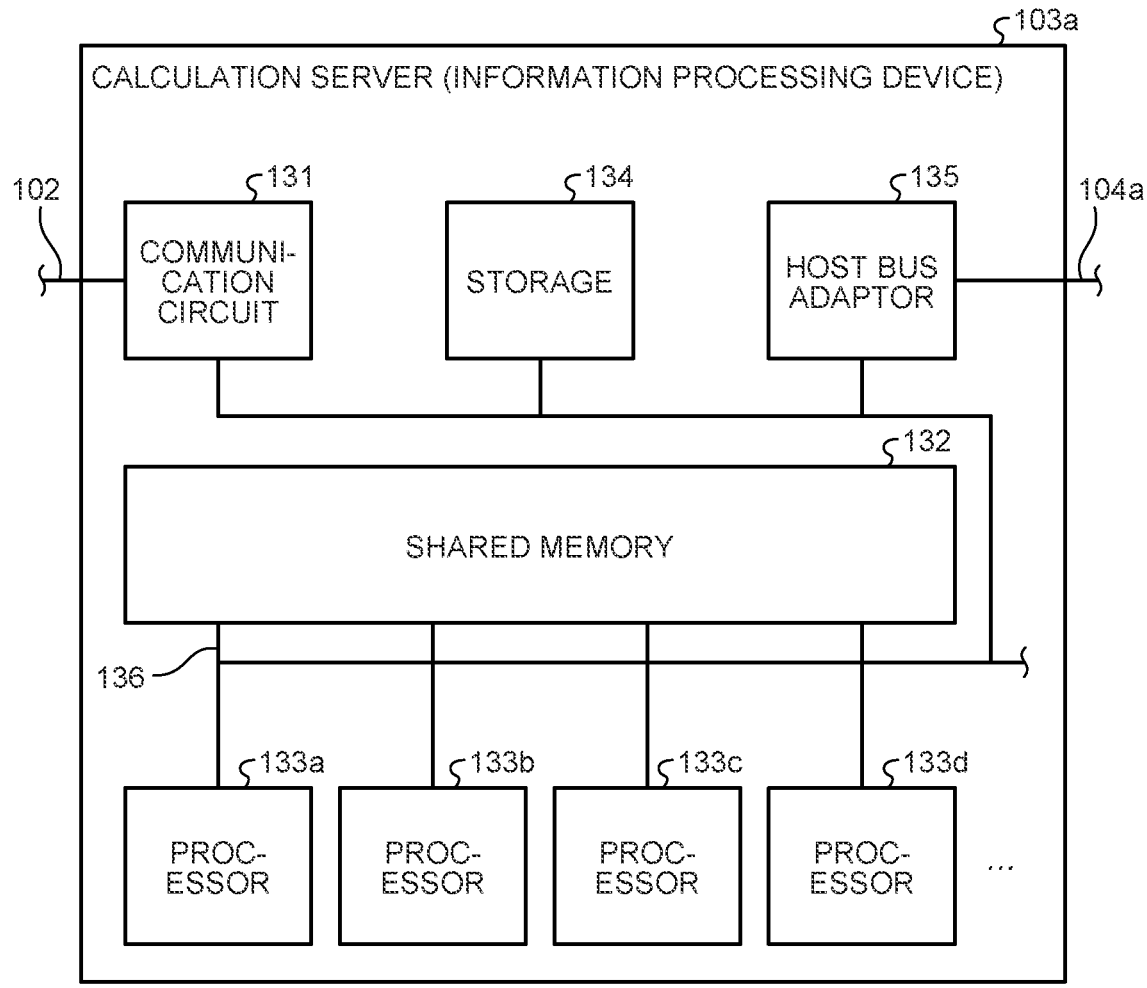
FIG. 13 is a configuration diagram illustrating a calculation server.

FIG. 13 is a diagram illustrating a configuration of the calculation server 103a. Other calculation servers 103 may have a configuration similar to that of the calculation server 103a or may have a configuration different from that of the calculation server 103a.

The calculation server 103a includes, for example, a communication circuit 131, a shared memory 132, processors 133a to 133d, a storage 134, and a host bus adaptor 135. The communication circuit 131, the shared memory 132, the processors 133a to 133d, the storage 134, and the host bus adaptor 135 are connected to each other through a bus 136.

The communication circuit 131 transmits/receives data to/from the devices connected to the network 102. The communication circuit 131 is, for example, a network interface card (NIC) for a wired LAN. However, the communication circuit 131 may be any other kind of communication circuit, such as a wireless LAN. The shared memory 132 is a memory accessible by the processors 133a to 133d. The shared memory 132 is, for example, a volatile memory such as a DRAM and an SRAM. However, the shared memory 132 may include any other kind of memory such as a nonvolatile memory. The processors 133a to 133d share data through the shared memory 132. The shared memory 132 is not necessarily configured with all of the memories of the calculation server 103a. For example, some memories of the calculation servers 103a may be local memories accessed only by any one of the processors 133a to 133d.

The processors 133a to 133d are electronic circuits that perform a calculation process. The processors 133a to 133d may be, for example, CPUs, GPUs, FPGAs, or ASICs, or may be a combination thereof. The processors 133a to 133d may be CPU cores or CPU threads. When the processors 133a to 133d are CPUs, the number of sockets included in the calculation server 103a is not limited. The processors 133a to 133d may be connected to any other components of the calculation server 103a through a bus such as PCI Express.

In the example in FIG. 13, the calculation server 103a includes four processors 133a to 133d. However, the number of processors included in one calculation server 103a is not limited to four.

The storage 134 stores a computer program for the calculation server 103a and a variety of data including data necessary for executing the computer program and data generated by the computer program. As used herein the computer program includes both an OS and an application. The storage 134 may be a volatile memory and a nonvolatile memory, or a combination thereof. The volatile memory is, for example, a DRAM or an SRAM. The nonvolatile memory is, for example, a NAND flash memory, an NOR flash memory, an ReRAM, or an MRAM. The storage 134 may include a hard disk, an optical disk, a magnetic tape, or an external storage device.

The host bus adaptor 135 implements data communication with other calculation servers 103. The host bus adaptor 135 is connected to the switch 105 through the cable 104a. The host bus adaptor 135 is, for example, a host channel adaptor (HCA). The host bus adaptor 135, the cable 104a, and the switch 105 form an interconnection that can achieve a high throughput and thereby can improve the speed of parallel calculation processing.

Figure 14:
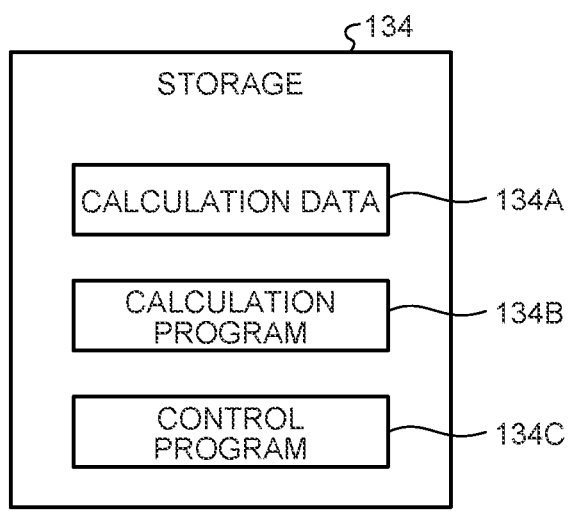
FIG. 14 is a diagram illustrating data stored in a storage.

FIG. 14 is a diagram illustrating data stored in the storage 134. The storage 134 stores, for example, calculation data 134A, a calculation program 134B, and a control program 134C. The calculation data 134A includes data in progress of calculation and a calculation result of the calculation server 103a. At least part of the calculation data 134A may be stored in a different storage level, such as the shared memory 132, a cache of a processor, or a register of a processor. The calculation program 134B is a computer program that implements a calculation process in each processor 133 and a storage process of data into the shared memory 132 and the storage 134. The control program 134C is a computer program that controls the calculation server 103a based on a command transmitted from the control module 113 of the management server 101 and transmits the calculation result of the calculation server 103a to the management server 101.

Such a calculation server 103a executes a computer program for the processors 133a to 133d to solve a combinatorial optimization problem. This computer program causes the calculation server 103a to function as the input module 12, the updating module 14, and the output module 16.

The information processing system 100 having such a configuration can be used as a PC cluster. The PC cluster is a system in which a plurality of computers are connected to achieve calculation performance unachievable by one computer.

The information processing system 100 can perform parallel calculation even in a configuration in which memories are distributed over a plurality of calculation servers 103, for example, using a message passing interface (MPI).

The information processing system 100 may be a plurality of GPUs connected through a high-speed link. In this case, each of the GPUs performs a process similar to that of the calculation server 103.

The present invention is not limited to the foregoing embodiments as they are and, in the implementation phase, can be embodied with constituent elements modified without departing from the spirit of the invention. A plurality of constituent elements disclosed in the foregoing embodiments may be combined as appropriate to form a variety of inventions. For example, some of all of the constituent elements described in the embodiments may be eliminated. The constituent elements in different embodiments may be combined as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

TECHNICAL IDEAS

The foregoing embodiments can be summarized in the following technical ideas.

Technical Idea 1

A calculation device configured to solve a combinatorial optimization problem, the calculation device including:
  a memory; and
  one or more processors coupled to the memory and configured to:
    alternately update, for a plurality of elements each associated with a first variable and a second variable, the first variable and the second variable, sequentially for unit times from an initial time to an end time; and
    output a solution to the combinatorial optimization problem based on the first variables of the plurality of elements at the end time, wherein
  the plurality of elements correspond to a plurality of discrete variables of the combinatorial optimization problem,
  the first variables and the second variables are each represented by a real number, and
  the one or more processors are configured to: in an updating process for each of the unit times, for each of the plurality of elements,
    update the first variable based on the second variable;
    when the first variable is smaller than a predetermined first value, change the first variable to the first value and change the second variable to a predetermined third value;
    when the first variable is greater than a predetermined second value greater than the first value, change the first variable to the second value and change the second variable to the third value; and
    add an acceleration value calculated by a predetermined computation to the second variable.

Technical Idea 2

The calculation device according to Technical Idea 1, wherein
  the one or more processors are configured to: in the updating process for each of the unit times, for each of the plurality of elements,
    update the second variable before updating the first variable; and
    add the acceleration value to the second variable after updating the first variable.

Technical Idea 3

The calculation device according to Technical Idea 1, wherein
  the one or more processors are configured to: in the updating process for each of the unit times, for each of the plurality of elements,
    update the second variable after updating the first variable; and
    add the acceleration value to the second variable after updating the first variable and before updating the second variable.

Technical Idea 4

The calculation device according to any one of Technical Ideas 1 to 3, wherein
  the one or more processors are configured to:
    calculate, for each of the plurality of elements at the end time, a value of a discrete variable by binarizing the first variable with a preset threshold value, and
    output the calculated values of the discrete variables as a solution to the combinatorial optimization problem.

Technical Idea 5

The calculation device according to any one of Technical Ideas 1 to 4, wherein the acceleration value includes a value obtained by multiplying the corresponding second variable at a previous time by a product of a prescribed coefficient and the unit time.

Technical Idea 6

The calculation device according to Technical Idea 5, wherein the prescribed coefficient includes a predetermined constant.

Technical Idea 7

The calculation device according to Technical Idea 5, wherein the prescribed coefficient includes a value determined by a random number.

Technical Idea 8

The calculation device according to any one of Technical Ideas 1 to 7, wherein
  the first value is −1,
  the second value is +1, and
  the third value is 0.

Technical Idea 9

The calculation device according to any one of Technical Ideas 1 to 8, wherein
  each of the plurality of elements corresponds to one of a plurality of processing circuits, and
  each of the processing circuits performs, for a corresponding element of the plurality of elements, a process of updating the first variable based on the second variable, processes of changing the first variable to the first value or the second value and changing the second variable to the third value, and a process of adding the acceleration value to the second variable.

Technical Idea 10

The calculation device according to any one of Technical Ideas 1 to 9, wherein
the one or more processors are configured to calculate, in the updating process for each of the unit times, for each of the plurality of elements, the first variable at a target time by adding a value obtained by multiplying the second variable, a predetermined constant, and the unit time to the first variable at a previous time by a unit time before the target time.

Technical Idea 11

The calculation device according to Technical Idea 10, wherein
the one or more processors are configured to calculate, in the updating process for each of the unit times, for each of the plurality of elements,
calculate an external force, based on the first variable of each of the plurality of elements and a predetermined action coefficient for each of sets of a target element and a corresponding element of the plurality of elements; and
calculate the second variable at the target time by adding a value obtained by multiplying a value determined by the external force and the first variable by the unit time, to the second variable at the previous time.

Technical Idea 12

The calculation device according to Technical Idea 11, wherein
the combinatorial optimization problem includes N discrete variables, and
the one or more processors are configured to calculate the first variable at the target time for an $i^{th}$ element corresponding to an $i^{th}$ discrete variable of the N discrete variables, by Equation (101) or (102), $$x_i(t+\Delta t) = x_i(t) + D y_i(t) \Delta t \tag{101}$$

$$x_i(t+\Delta t) = x_i(t) + D y_i(t+\Delta t) \Delta t \tag{102}$$

where
N is an integer equal to or greater than 2,
i is any integer of 1 to N,
D is the constant,
$\Delta t$ is the unit time,
t is the previous time,
$t+\Delta t$ is the target time,
$x_i(t)$ is the first variable of the $i^{th}$ element at the previous time,
$y_i(t)$ is the second variable of the $i^{th}$ element at the previous time,
$x_i(t+\Delta t)$ is the first variable of the $i^{th}$ element at the target time, and
$y_i(t+\Delta t)$ is the second variable of the $i^{th}$ element at the target time.

Technical Idea 13

The calculation device according to Technical Idea 12, wherein
the combinatorial optimization problem is a quadratic unconstrained binary optimization (QUBO) problem, and
the one or more processors are configured to calculate the second variable of the $i^{th}$ element at the target time by Equation (103) or Equation (104), $$y_i(t+\Delta t) = y_i(t) + [\{-D+p(t+\Delta t)\}x_i(t+\Delta t) + f_i(t+\Delta t)] \Delta t \tag{103}$$

$$y_i(t+\Delta t) = y_i(t) + [\{-D+p(t)\}x_i(t) + f_i(t)] \Delta t \tag{104}$$

where $f_i(t+\Delta t)$ is given by Equation (105), and $f_i(t)$ is given by Equation (106), $$f_i(t+\Delta t) = -c z_i(t+\Delta t) \tag{105}$$

$$f_i(t) = -c z_i(t) \tag{106}$$

where
$z_i(t+\Delta t)$ is given by Equation (107), and
$z_i(t)$ is given by Equation (108), $$z_i(t+\Delta t) = -h_i \alpha(t+\Delta t) - \sum_{j=1}^{N} J_{i,j} x_j(t+\Delta t) \tag{107}$$

$$z_i(t) = -h_i \alpha(t) - \sum_{j=1}^{N} J_{i,j} x_j(t) \tag{108}$$

where
j is any integer of 1 to N,
$h_i$ is an $i^{th}$ local magnetic field coefficient included in a predetermined array including N local magnetic field coefficients,
$J_{i,j}$ is a coupling coefficient at an $i^{th}$ row and a $j^{th}$ column included in a predetermined matrix including N×N coupling coefficients,
c is a coefficient,
$x_j(t)$ is the first variable at the previous time for a $j^{th}$ element corresponding to a $j^{th}$ discrete variable of the N discrete variables,
$x_j(t+\Delta t)$ is the first variable of the $j^{th}$ element at the target time,
p(t) is a predetermined function with t as a variable, in which p(t) increases as t increases, becomes 0 with t at the initial time, and becomes 1 with t at the end time, and
$\alpha(t)$ is a predetermined function with t as a variable.

Technical Idea 14

A calculation method of solving a combinatorial optimization problem by an information processing device, the calculation method including:
alternately updating, by the information processing device, for a plurality of elements each associated with a first variable and a second variable, the first variable and the second variable, sequentially for unit times from an initial time to an end time; and
outputting, by the information processing device, a solution to the combinatorial optimization problem based on the first variables of the plurality of elements at the end time, wherein
the plurality of elements correspond to a plurality of discrete variables of the combinatorial optimization problem,
the first variables and the second variables are each represented by a real number, and
in an updating process for each of the unit times by the information processing device, the updating includes: for each of the plurality of elements,
updating the first variable based on the second variable;
when the first variable is smaller than a predetermined first value, changing the first variable to the first value and changing the second variable to a predetermined third value;

when the first variable is greater than a predetermined second value greater than the first value, changing the first variable to the second value and changing the second variable to the third value; and adding an acceleration value calculated by a predetermined computation to the second variable.

Technical Idea 15

A computer program product including a computer readable medium including programmed instructions for solving a combinatorial optimization problem by an information processing device, the instructions causing the information processing device to execute:

alternately updating, for a plurality of elements each associated with a first variable and a second variable, the first variable and the second variable, sequentially for unit times from an initial time to an end time; and outputting a solution to the combinatorial optimization problem based on the first variables of the plurality of elements at the end time, wherein the plurality of elements correspond to a plurality of discrete variables of the combinatorial optimization problem, the first variables and the second variables are each represented by a real number, and in an updating process for each of the unit times, the updating includes: for each of the plurality of elements, updating the first variable based on the second variable;

when the first variable is smaller than a predetermined first value, changing the first variable to the first value and changing the second variable to a predetermined third value;

when the first variable is greater than a predetermined second value greater than the first value, changing the first variable to the second value and changing the second variable to the third value; and adding an acceleration value calculated by a predetermined computation to the second variable.

What is claimed is:

1. A calculation device configured to solve a combinatorial optimization problem, the calculation device comprising:

a computing circuit comprising:

a first memory and a second memory storing a plurality of elements, wherein elements of the plurality of elements stored in the first memory are associated with a first variable and elements of the plurality of elements stored in the second memory are associated with a second variable; and an updating circuit coupled to the first memory and the second memory, and configured to alternately update, for each of the plurality of elements, the first variable and the second variable, sequentially for unit times from an initial time to an end time; and an output circuit coupled to the computing circuit and configured to output a solution to the combinatorial optimization problem based on the first variables of the plurality of elements at the end time, wherein the plurality of elements correspond to a plurality of discrete variables of the combinatorial optimization problem, the first variable and the second variable are each represented by a real number, and the computing circuit is configured to: in an updating process for each of the unit times, for each of the plurality of elements, output the first variable from the first memory to a first adder of the updating circuit to update the first variable based on the second variable;

output the second variable from the second memory to a second adder and a first multiplier of the updating circuit, the second adder updates the second variable based on the first variable, the first multiplier to calculate an acceleration value according to a predetermined computation;

generate a first enable signal by a determination circuit of the updating circuit when the first variable is smaller than a predetermined first value, change the first variable to the predetermined first value and change the second variable to a predetermined third value in response to the first enable signal;

generate a second enable signal by the determination circuit when the first variable is greater than a predetermined second value greater than the predetermined first value, change the first variable to the predetermined second value and change the second variable to the predetermined third value in response to the second enable signal; and add, by a third adder of the updating circuit, the acceleration value to the second variable, wherein the output circuit is configured to:

calculate, for each of the plurality of elements at the end time, a value of a discrete variable by binarizing the first variable with a preset threshold value, and output the calculated values of the discrete variables as the solution to the combinatorial optimization problem.

2. The calculation device according to claim 1, wherein the updating circuit is configured to: in the updating process for each of the unit times, for each of the plurality of elements, update the second variable before updating the first variable; and add the acceleration value to the second variable after updating the first variable.

3. The calculation device according to claim 1, wherein the updating circuit is configured to: in the updating process for each of the unit times, for each of the plurality of elements, update the second variable after updating the first variable; and add the acceleration value to the second variable after updating the first variable and before updating the second variable.

4. The calculation device according to claim 1, wherein the acceleration value includes a value obtained by multiplying the corresponding second variable at a previous time by a product of a prescribed coefficient and the unit time.

5. The calculation device according to claim 1, wherein each of the plurality of elements corresponds to one of a plurality of processing circuits, and each of the processing circuits performs, for a corresponding element of the plurality of elements, a process of updating the first variable based on the second variable, processes of changing the first variable to the predetermined first value or the predetermined second value and changing the second variable to the predetermined third value, and a process of adding the acceleration value to the second variable.

6. The calculation device according to claim 1, wherein the updating circuit is configured to calculate, in the updating process for each of the unit times, for each of the plurality of elements, the first variable at a target time by adding a value obtained by multiplying the second variable, a predetermined constant, and the unit time to the first variable at a previous time by a unit time before the target time.

7. The calculation device according to claim 6, wherein the updating circuit is configured to: in the updating process for each of the unit times, for each of the plurality of elements,
calculate an external force, based on the first variable of each of the plurality of elements and a predetermined action coefficient for each of sets of a target element and a corresponding element of the plurality of elements; and
calculate the second variable at the target time by adding a value obtained by multiplying a value determined by the external force and the first variable by the unit time, to the second variable at the previous time.

8. A calculation method of solving a combinatorial optimization problem by an information processing device, wherein the information processing device comprises a computing circuit and an output circuit, wherein the computing circuit comprises a first memory, a second memory, and an updating circuit, the calculation method comprising:
storing a plurality of elements using the first memory and the second memory, wherein elements of the plurality of elements stored in the first memory are associated with a first variable and elements of the plurality of elements stored in the second memory are associated with a second variable;
alternately updating, by the updating circuit coupled to the first memory and the second memory, for each of the plurality of elements, the first variable and the second variable, sequentially for unit times from an initial time to an end time; and
outputting, by the output circuit coupled to the computing circuit, a solution to the combinatorial optimization problem based on the first variables of the plurality of elements at the end time, wherein
the plurality of elements correspond to a plurality of discrete variables of the combinatorial optimization problem,
the first variable and the second variable are each represented by a real number, and
in an updating process for each of the unit times by the computing circuit, the updating process comprises: for each of the plurality of elements,
outputting the first variable from the first memory to a first adder of the updating circuit to updating the first variable based on the second variable;
outputting the second variable from the second memory to a second adder and a first multiplier of the updating circuit, the second adder updates the second variable based on the first variable, the first multiplier to calculate an acceleration value according to a predetermined computation;
generating an enable signal by a determination circuit of the updating circuit based on a comparison between the first variable is smaller than and a predetermined first value and a predetermined second value greater than the predetermined first value, changing the first variable to the predetermined first value or the predetermined second value and changing the second variable to a predetermined third value in response to the enable signal; and
adding, by a third adder of the updating circuit, the acceleration value to the second variable, wherein the calculation method further comprises:
calculating, by the output circuit, for each of the plurality of elements at the end time, a value of a discrete variable by binarizing the first variable with a preset threshold value, and
outputting, by the output circuit, the calculated values of the discrete variables as the solution to the combinatorial optimization problem.

9. A computer program product comprising a non-transitory computer readable medium including programmed instructions for solving a combinatorial optimization problem by an information processing device, wherein the information processing device comprises a computing circuit and an output circuit, wherein the computing circuit comprises a first memory, a second memory, and an updating circuit, the instructions causing the information processing device to execute:
storing a plurality of elements using the first memory and the second memory, wherein elements of the plurality of elements stored in the first memory are associated with a first variable and elements of the plurality of elements stored in the second memory are associated with a second variable;
alternately updating, by the updating circuit coupled to the first memory and the second memory, for each of the plurality of elements, the first variable and the second variable, sequentially for unit times from an initial time to an end time; and
outputting, by the output circuit coupled to the computing circuit, a solution to the combinatorial optimization problem based on the first variables of the plurality of elements at the end time,
the plurality of elements correspond to a plurality of discrete variables of the combinatorial optimization problem,
the first variable and the second variable are each represented by a real number, and
in an updating process for each of the unit times by the computing circuit, the updating process comprises: for each of the plurality of elements,
outputting the first variable from the first memory to a first adder of the updating circuit to updating the first variable based on the second variable;
outputting the second variable from the second memory to a second adder and a first multiplier of the updating circuit, the second adder updates the second variable based on the first variable, the first multiplier to calculate an acceleration value according to a predetermined computation;
generating a first enable signal by a determination circuit of the updating circuit in response to a determination that the first variable is smaller than a predetermined first value, changing the first variable to the predetermined first value and changing the second variable to a predetermined third value in response to the first enable signal;
generating a second enable signal by a determination circuit of the updating circuit in response to a determination that the first variable is greater than a predetermined second value greater than the predetermined first value, changing the first variable to the predetermined second value and changing the second variable to the predetermined third value in response to the second enable signal; and
adding, by a third adder of the updating circuit, the acceleration value to the second variable,
wherein the instructions further cause the information processing device to execute:

calculating, by the output circuit, for each of the plurality of elements at the end time, a value of a discrete variable by binarizing the first variable with a preset threshold value, and outputting, by the output circuit, the calculated values of the discrete variables as the solution to the combinatorial optimization problem.

\* \* \* \* \*